(12) United States Patent
Lee et al.

(10) Patent No.: US 11,914,916 B2
(45) Date of Patent: Feb. 27, 2024

(54) METHOD FOR CONTROLLING DISPLAY AND ELECTRONIC DEVICE THEREFOR

(71) Applicant: SAMSUNG ELECTRONICS CO., LTD., Suwon-si (KR)

(72) Inventors: Seungeun Lee, Suwon-si (KR); Hyewon Seo, Suwon-si (KR); Minseok Kang, Suwon-si (KR); Nanhee Kim, Suwon-si (KR); Seungnyun Kim, Suwon-si (KR); Yongsang Yun, Suwon-si (KR); Youngchan Cho, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/974,419

(22) Filed: Oct. 26, 2022

(65) Prior Publication Data
US 2023/0185509 A1 Jun. 15, 2023

Related U.S. Application Data

(63) Continuation of application No. PCT/KR2021/005283, filed on Apr. 27, 2021.

(30) Foreign Application Priority Data

Apr. 27, 2020 (KR) .................. 10-2020-0050951

(51) Int. Cl.
*G06F 3/14* (2006.01)
*G06F 1/16* (2006.01)

(52) U.S. Cl.
CPC .......... *G06F 3/1431* (2013.01); *G06F 1/1641* (2013.01)

(58) Field of Classification Search
CPC ............................ G06F 3/1431; G06F 1/1641
See application file for complete search history.

(56) References Cited

U.S. PATENT DOCUMENTS 9,329,679 B1 5/2016 Shepard et al.
9,612,621 B2 4/2017 Lee et al.
(Continued)

FOREIGN PATENT DOCUMENTS

KR   10-2015-0060278   6/2015
KR   10-1532095        6/2015
(Continued)

OTHER PUBLICATIONS

International Search Report dated Apr. 27, 2020, 3 pages.
Written Opinion of the ISA dated Apr. 27, 2020, 4 pages.

*Primary Examiner* — Matthew A Eason
*Assistant Examiner* — Sujit Shah
(74) *Attorney, Agent, or Firm* — Nixon & Vanderhye P.C.

(57) ABSTRACT

According to various embodiments, disclosed is an electronic device comprising: a first housing, a second housing, a hinge structure comprising a hinge, at least one display, a sensing circuit, and a processor, wherein the processor is configured to: control the display to display, on a first display area, a first execution screen according to execution of a first application; monitor whether an event related to a second application has occurred, while the first execution screen is displayed on the first display area; and control the display to display, in response to at least one of a folding operation sensed through the sensing circuit based on occurrence of the event or a rotating operation of the electronic device, identified from a physical movement based on occurrence of the event, a second execution screen related to the event on the second display area while the first application is being executed.

17 Claims, 14 Drawing Sheets

(56) References Cited

U.S. PATENT DOCUMENTS

| | | |
|---|---|---|
| 10,503,368 B2 | 12/2019 | Kang et al. |
| 2010/0001980 A1 | 1/2010 | Kim et al. |
| 2010/0064536 A1 | 3/2010 | Caskey et al. |
| 2010/0227650 A1 | 9/2010 | Kim et al. |
| 2014/0201653 A1 | 7/2014 | Han et al. |
| 2015/0130738 A1* | 5/2015 | Park .................. G06F 3/1423 345/173 |
| 2015/0319282 A1 | 11/2015 | Park et al. |
| 2015/0338888 A1 | 11/2015 | Kim et al. |
| 2016/0370877 A1 | 12/2016 | Seo et al. |
| 2017/0178470 A1* | 6/2017 | Khoshkava .......... G06F 3/0412 |
| 2018/0331991 A1* | 11/2018 | Kim .................... G06F 3/0486 |
| 2019/0042066 A1 | 2/2019 | Kim et al. |
| 2020/0128116 A1 | 4/2020 | Jang et al. |

FOREIGN PATENT DOCUMENTS

| | | |
|---|---|---|
| KR | 10-2016-0032079 | 3/2016 |
| KR | 10-1713167 | 3/2017 |
| KR | 10-1730047 | 4/2017 |
| KR | 10-1916416 | 11/2018 |
| KR | 10-2074516 | 2/2020 |
| KR | 10-2020-0037761 | 4/2020 |
| KR | 10-2014-0091296 | 7/2021 |

\* cited by examiner

METHOD FOR CONTROLLING DISPLAY AND ELECTRONIC DEVICE THEREFOR

CROSS-REFERENCE TO RELATED APPLICATIONS

This application is a continuation of International Application No. PCT/KR2021/005283 designating the United States, filed on Apr. 27, 2021, in the Korean Intellectual Property Receiving Office and claiming priority to Korean Patent Application No. 10-2020-0050951, filed on Apr. 27, 2020, in the Korean Intellectual Property Office, the disclosures of which are incorporated by reference herein in their entireties.

BACKGROUND

Field

The disclosure relates to controlling a display.

Description of Related Art

An electronic device (e.g., a foldable phone) may display various screens on a display area. For example, in the case of executing a first application (e.g., a game program), an electronic device may display the first application on a display area. In addition, if an event (e.g., message notification) related to a second application (e.g., a messaging service program) occurs while the first application is running, the electronic device may display information (e.g., a message screen) related to the second application on the display area in response to the event.

When displaying a screen (hereinafter, a second execution screen) according to execution of a second application (e.g., a messaging service program) while displaying a screen (hereinafter, a first execution screen) according to execution of a first application (e.g., a game program) on a display area, an electronic device (e.g., a foldable phone) may switch from the first execution screen to the second execution screen. In this case, the electronic device may display the second execution screen according to switching of the screen, but the first execution screen displayed on the display area may switch to an inactive state. In addition, as the first execution screen switches to the inactive state, the electronic device may terminate the execution of the first application.

SUMMARY

Embodiments of the disclosure provide a display control method for, when a plurality of applications is displayed on a display area of an electronic device, maintaining execution of each of the plurality of applications and providing a user with continuous usability for each of the plurality of applications, and an electronic device therefor.

An electronic device according to an example embodiment may include: a first housing including a first surface and a second surface facing an opposite direction of the first surface, a second housing including third surface disposed to face the first surface based on a rotational direction and a fourth surface facing an opposite direction of the third surface, a hinge structure comprising a hinge configured to rotatably connect the first housing and the second housing, at least one display including a first display area disposed on at least one of the first surface and the third surface, and a second display area disposed on at least one of the second surface and the fourth surface, a sensing circuit configured to sense at least one of a folding operation between the first housing and the second housing and a physical movement of the electronic device, and a processor electrically connected to the display and the sensing circuit, wherein the processor may be configured to: control the display to display a first execution screen based on execution of a first application on the first display area, monitor whether an event related to a second application occurs while the first execution screen is displayed on the first display area, and display, in response to at least one of the folding operation sensed through the sensing circuit or a rotating operation of the electronic device identified from the physical movement based on the occurrence of the event, a second execution screen related to the event on the second display area while the first application is being executed.

In addition, a method according to an example embodiment may include: displaying a first execution screen based on execution of a first application on a first display area of a display, monitoring whether an event related to a second application occurs while the first execution screen is displayed on the first display area, and displaying, in response to at least one of a folding operation between a first housing and a second housing sensed through a sensing circuit based on the occurrence of the event and a rotating operation of an electronic device identified from a physical movement of the electronic device, a second execution screen related to the event on the second display area of the display while the first application is being executed.

According to various example embodiments, when displaying a plurality of applications on a display, an electronic device (e.g., a foldable phone) may provide a user with continuous usability for each of the plurality of applications by maintaining the execution of each of the plurality of applications.

In addition, according to various example embodiments, an electronic device (e.g., a foldable phone) may further display a screen (e.g., a second execution screen) other than a first execution screen on the display, based on an operation (e.g., a folding operation or a rotating operation) of the electronic device.

In addition, various effects that are directly or indirectly identified through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same reference numerals may be assigned to the same or corresponding elements.

DETAILED DESCRIPTION

Hereinafter, various example embodiments of the disclosure will be described with reference to the accompanying drawings. However, this is not intended to limit the disclosure to a specific embodiment, and it should be understood that the disclosure encompasses various modifications, equivalents, and/or alternatives to the embodiments thereof.

Figure 1:
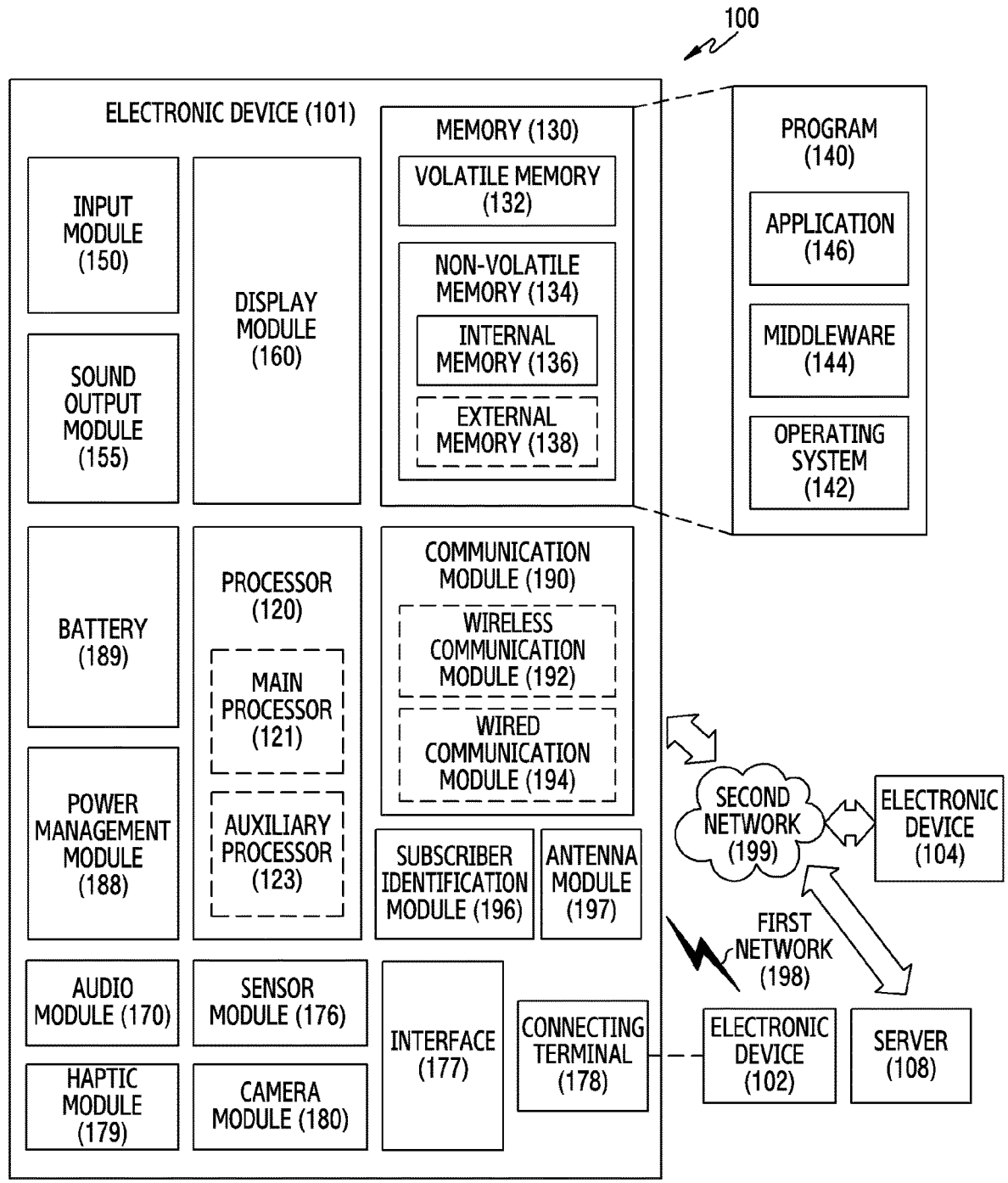
FIG. 1 is a diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
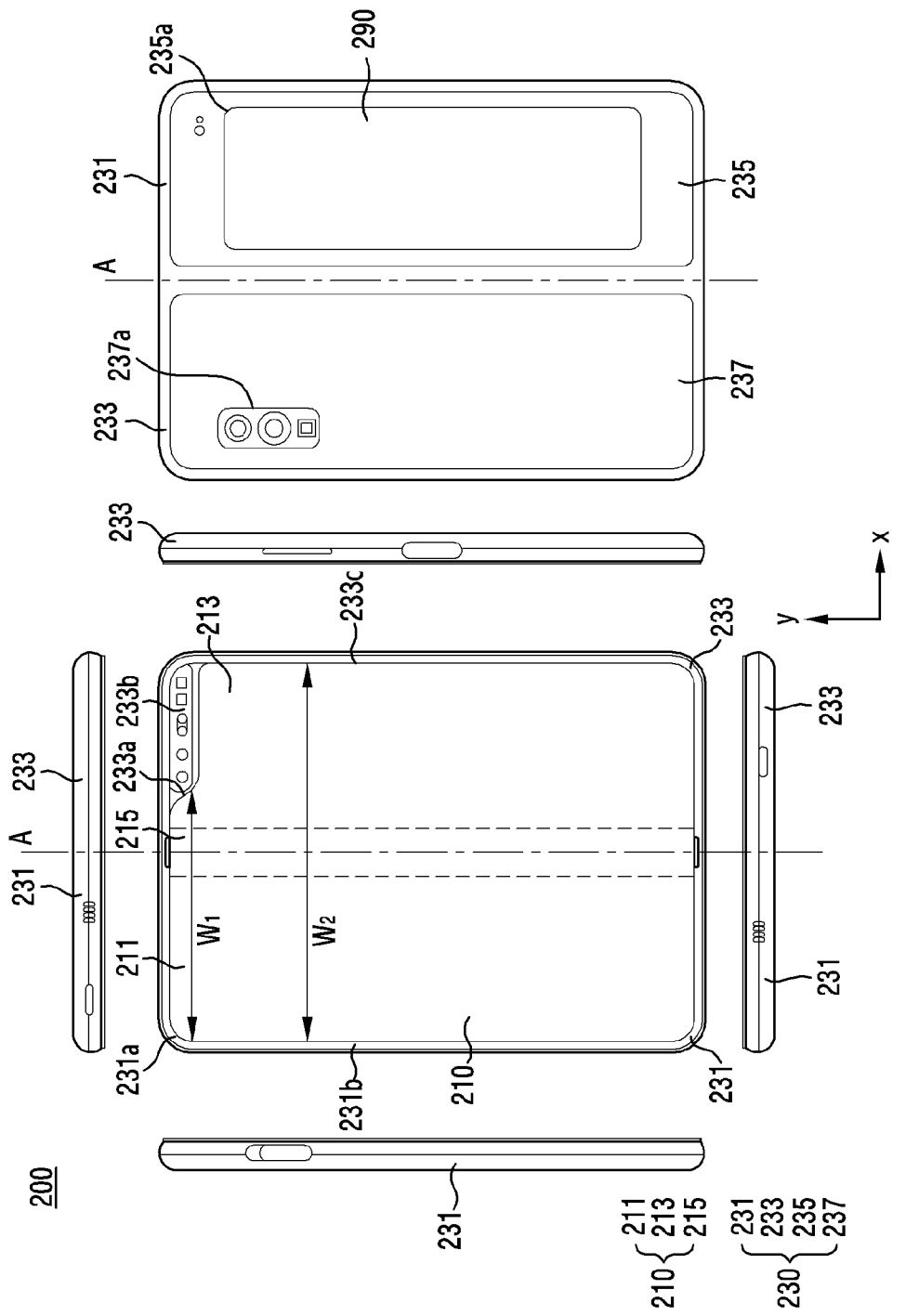
FIG. 2A is a diagram illustrating a flat state of an electronic device according to various embodiments.
Figure 2B:
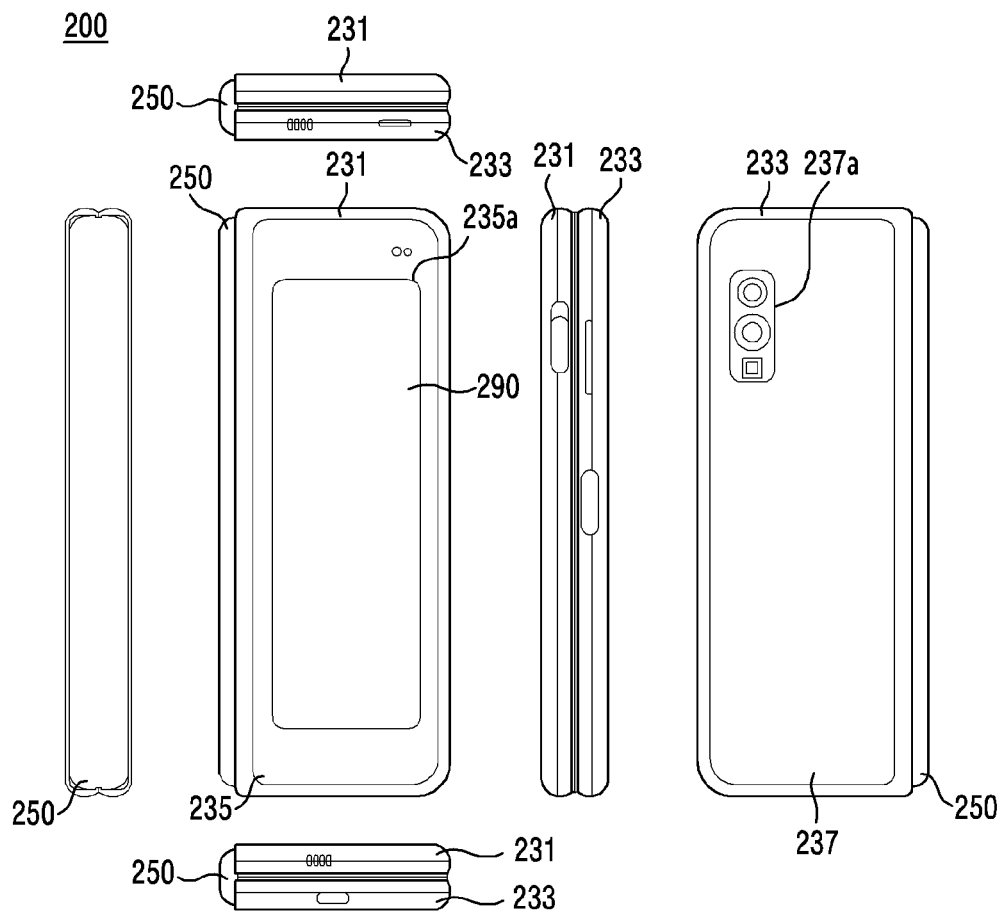
FIG. 2B is a diagram illustrating a folded state of an electronic device according to various embodiments

FIG. 2A is a diagram illustrating a flat state of an electronic device according to various embodiments. FIG. 2B is a diagram illustrating a folded state of an electronic device according to various embodiments.

Referring to FIGS. 2A and 2B, in an embodiment, an electronic device 200 may include a foldable housing 230, a hinge cover 250 covering a foldable portion of the foldable housing, and a flexible or foldable display 210 (hereinafter, a display 210) disposed in a space formed by the foldable housing 230. In the disclosure, the surface on which the display 210 is disposed will be defined as a first surface or a front surface of the electronic device 200. In addition, the surface opposite the front surface will be defined as a second surface or a rear surface of the electronic device 200. In addition, the surface surrounding a space between the front surface and the rear surface will be defined as a third surface or a side surface of the electronic device 200.

In an embodiment, the foldable housing 230 may include a first housing structure 231, a second housing structure 233 including a sensor area 233b, a first rear cover 235, and a second rear cover 237. The foldable housing 310 of the electronic device 200 is not limited to the shape and coupling shown in FIGS. 2A and 2B, and may be implemented by a combination and/or coupling of other shapes or components. For example, in an embodiment, the first housing structure 231 and the first rear cover 235 may be integrally formed, and the second housing structure 233 and the second rear cover 237 may be integrally formed.

In the illustrated embodiment, the first housing structure 231 and the second housing structure 233 may be disposed on both sides of a folding axis (axis A) and may have an overall symmetrical shape with respect to the folding axis A. As will be described later, the first housing structure 231 and the second housing structure 233 may have different angles or distances therebetween depending on whether the electronic device 200 is in a flat state, a folded state, or an intermediate state. In the illustrated embodiment, the second housing structure 233, unlike the first housing structure 231, may further include a sensor area 233b in which various sensors are disposed, but may have an overall symmetrical shape in other areas, excluding the sensor area.

In an embodiment, as shown in FIG. 1, the first housing structure 231 and the second housing structure 233 may together form a recess for accommodating the display 210. In the illustrated embodiment, the recess may have two or more different widths in a direction perpendicular to the folding axis (axis A) according to the sensor area 233b.

For example, the recess may have (1) a first width w1 between a first portion 231a of the first housing structure 231, which is parallel to the folding axis (axis A), and a first portion 233a of the second housing structure 233, which is formed in the periphery of the sensor area 233b, and (2) a second width w2 formed by a second portion 231b of the first housing structure 231 and a second portion 233c of the second housing structure 233, which does not belong to the sensor area 233b and is parallel to the folding axis (axis A). In this case, the second width w2 may be formed to be greater than the first width w1. In other words, the first portion 231a of the first housing structure 231 and the first portion 233a of the second housing structure 233, which have a mutually asymmetric shape, may form the first width w1 of the recess, and the second portion 231b of the first housing structure 233 and the second portion 231b of the second housing structure 233, which have a mutually symmetrical shape, may form the second width w2 of the recess. In an embodiment, the first portion 233a and the second portion 233c of the second housing structure 233 may have different distances from the folding axis (axis A). The widths of the recess are not limited to the illustrated example. In various embodiments, the recess may have a plurality of widths depending on the shape of the sensor area 233b or the asymmetric shape of the first housing structure 231 and the second housing structure 233.

In an embodiment, at least a portion of the first housing structure 231 and the second housing structure 233 may be formed of a metal material or a non-metal material having a rigidity selected to support the display 210.

In an embodiment, the sensor area 233b may be formed to have a predetermined area adjacent to one corner of the second housing structure 233. However, the arrangement, shape, and size of the sensor area 233b are not limited to the illustrated example. For example, in an embodiment, the sensor area 233b may be provided at another corner of the second housing structure 233 or at any area between the top and bottom corners. In an embodiment, components for performing various functions embedded in the electronic device 200 may be exposed on the front surface of the electronic device 200 through the sensor area 233b or through one or more openings provided in the sensor area 233b. In various embodiments, the components may include various types of sensors. The sensors may include, for example, at least one of a front camera, a receiver, or a proximity sensor.

The first rear cover 235 may be disposed on one side of the folding axis (axis A) and on the rear surface of the electronic device 200, and may have, for example, a substantially rectangular periphery surrounded by the first housing structure 231. Likewise, the second rear cover 237 may be disposed on the other side of the folding axis (axis A) and on the rear surface of the electronic device, and its periphery may be surrounded by the second housing structure 233.

In the illustrated embodiment, the first rear cover 235 and the second rear cover 237 may have a substantially symmetrical shape with respect to the folding axis (axis A). However, the first rear cover 235 and the second rear cover 237 do not necessarily have a symmetrical shape, and in an embodiment, the electronic device 200 may include a first rear cover 235 and a second rear cover 237 having various shapes. In an embodiment, the first rear cover 235 may be integrally formed with the first housing structure 231, and the second rear cover 237 may be integrally formed with the second housing structure 233.

In an embodiment, the first rear cover 235, the second rear cover 237, the first housing structure 231, and the second housing structure 233 may form a space in which various components (e.g., a printed circuit board or a battery) of the electronic device 200 may be disposed. In an embodiment, one or more components may be disposed on the rear surface of the electronic device 200 or visually exposed therethrough. For example, at least a portion of a sub-display 290 may be visually exposed through a first rear area 235a of the first rear cover 235. In an embodiment, one or more components or sensors may be visually exposed through a second rear area 237a of the second rear cover 237. In various embodiments, the sensor may include a proximity sensor and/or a rear camera.

Referring to FIG. 2, the hinge cover 250 may be configured to be disposed between the first housing structure 231 and the second housing structure 233 and cover internal components (e.g., a hinge structure). In an embodiment, the hinge cover 250 may be covered by a portion of the first housing structure 231 and the second housing structure 233 or exposed to the outside depending on the state (flat state or folded state) of the electronic device 200.

For example, as shown in FIG. 2A, when the electronic device 200 is in the flat state, the hinge cover 250 may be covered by the first housing structure 231 and the second housing structure 233 so as not to be exposed. For example, when the electronic device 200 is in the folded state (e.g., a fully folded state) as shown in FIG. 2A, the hinge cover 250 may be exposed to the outside between the first housing structure 231 and the second housing structure 233. For example, in the intermediate state in which the first housing structure 231 and the second housing structure 233 are folded with a certain angle, the hinge cover 250 may be partially exposed to the outside between the first housing structure 231 and the second housing structure 233. However, in this case, the exposed area may be smaller than that in the fully folded state. In an embodiment, the hinge cover 250 may include a curved surface.

The display 210 may be disposed in a space formed by the foldable housing 230. For example, the display 210 may be seated on the recess formed by the foldable housing 230 and may comprise most of the front surface of the electronic device 200.

Accordingly, the front surface of the electronic device 200 may include the display 210, and a partial area of the first housing structure 231 and a partial area of the second housing structure 233, which are adjacent to the display 210. In addition, the rear surface of the electronic device 200 may include a first rear cover 235, a partial area of the first housing structure 231 adjacent to the first rear cover 235, a second rear cover 237, and a partial area of the second housing structure 233 adjacent to the second rear cover 237.

The display 210 may indicate a display in which at least a partial area thereof may be deformed into a flat or curved surface. In an embodiment, the display 210 may include a folding area 215, a first area 211 disposed on one side (the left side of the folding area 215 shown in FIG. 1) of the folding area 215, and a second area 213 disposed on the other side (the right side of the folding area 215 shown in FIG. 1) thereof.

The display 210 in FIG. 2A has been divided into areas by way of example, and the display 210 may be divided into a plurality (e.g., four or more, or two) areas according to a structure or functions thereof. For example, although the display 210 may be divided into areas by the folding area 215 or folding axis (axis A) extending parallel to the y-axis in the embodiment shown in FIG. 2A, in an embodiment, the display 210 may be divided into areas, based on another folding area (e.g., a folding area parallel to the x-axis) or another folding axis (e.g., a folding axis parallel to the x-axis).

The first area 211 and the second area 213 may have an overall symmetrical shape with respect to the folding area 215. However, unlike the first area 211, the second area 213 may include a notch cut according to the presence of the sensor area 233*b* but may have a symmetrical shape to the first area 211 in other areas. In other words, the first area 211 and the second area 213 may include portions having a shape symmetric to each other and portions having a shape asymmetric to each other.

Hereinafter, the operation of the first housing structure 231 and the second housing structure 233 depending on the state of the electronic device 200 (e.g., a flat state and a folded state), and the respective areas of the display 210 will be described.

In an embodiment, when the electronic device 200 is in the flat state (e.g., the state shown in FIG. 2A), the first housing structure 231 and the second housing structure 233 may be disposed to form an angle of about 180 degrees therebetween, facing in the same direction. The surface of the first area 211 and the surface of the second area 213 of the display 210 may form about 180 degrees therebetween and may face in the same direction (e.g., the direction of the front surface of the electronic device). The folding area 215 may be substantially coplanar with the first area 211 and the second area 213.

In an embodiment, when the electronic device 200 is in the folded state (e.g., the state shown in FIG. 2B), the first housing structure 231 and the second housing structure 233 may be disposed to face each other. The surface of the first area 211 and the surface of the second area 213 of the display 210 may face each other with a narrow angle (e.g., between 0 degrees and 10 degrees) therebetween. At least a portion of the folding area 215 may be formed of a curved surface having a predetermined curvature.

In an embodiment, when the electronic device 200 is in the intermediate state (e.g., an intermediate state between the state in FIG. 2A and the state in FIG. 2B), the first housing structure 231 and the second housing structure 233 may be disposed at a certain angle therebetween. The surface of the first area 211 and the surface of the second area 213 of the display 210 may form an angle greater than that in the folded state and smaller than that in the flat state. At least a portion of the folding area 215 may be formed of a curved surface having a predetermined curvature, and the curvature may be smaller than that in the folded state.

Figure 3:
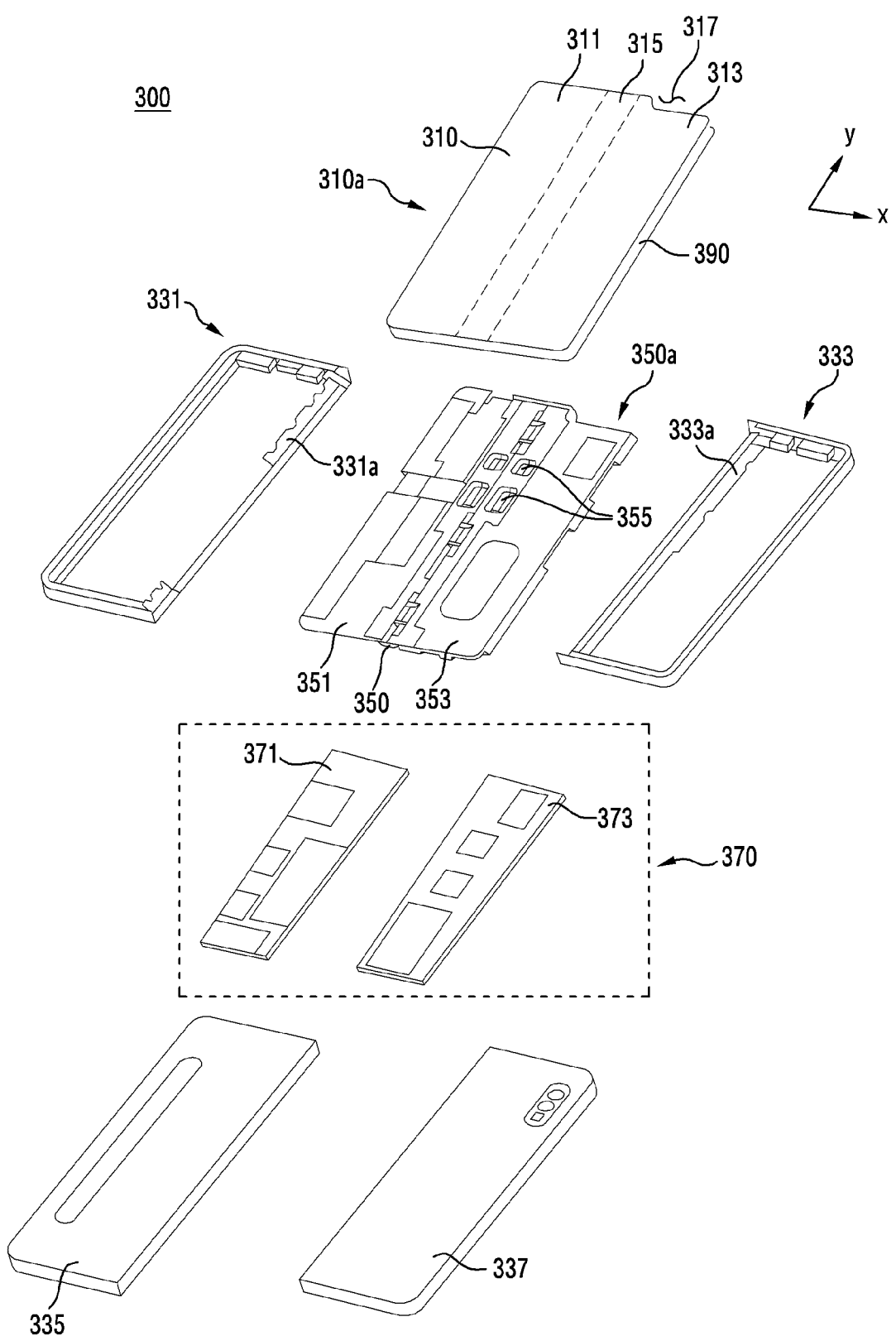
FIG. 3 is an exploded perspective view of an electronic device according to various embodiments

FIG. 3 is an exploded perspective view of an electronic device according to various embodiments.

Referring to FIG. 3, in an embodiment, an electronic device 300 may include a display unit 310*a*, a bracket assembly 350*a*, a substrate part 370, a first housing structure 331, a second housing structure 333, a first rear cover 335, and a second rear cover 337. In the disclosure, the display unit 310*a* may be referred to as a display module or a display assembly.

The display unit 310*a* may include a display 310 and one or more plates or layers 390 on which the display 310 is mounted. In an embodiment, the plate 390 may be disposed between the display 310 and the bracket assembly 350*a*. The display 310 may be disposed in at least a portion of one surface (e.g., an upper surface in FIG. 3) of the plate 390. The plate 390 may be formed in a shape corresponding to the display 310. For example, a partial area of the plate 390 may be formed in a shape corresponding to a notch 317 of the display 310.

The bracket assembly 350*a* may include a first bracket 351, a second bracket 353, a hinge structure disposed between the first bracket 351 and the second bracket 353, a hinge cover 350 that covers the hinge structure to be invisible to the outside, and a wiring member 355 (e.g., a flexible printed circuit (FPC) board) crossing the first bracket 351 and the second bracket 353.

In an embodiment, the bracket assembly 350*a* may be disposed between the plate 390 and the substrate part 370. For example, the first bracket 351 may be disposed between the first area 311 of the display 310 and the first substrate 371. The second bracket 353 may be disposed between the second area 313 of the display 310 and the second substrate 373.

In an embodiment, at least a portion of the wiring member 355 and hinge structure may be disposed inside the bracket assembly 350*a*. The wiring member 355 may be disposed in a direction (e.g., the x-axis direction) crossing the first bracket 351 and the second bracket 353. The wiring member 355 may be disposed in a direction (e.g., the x-axis direction) perpendicular to the folding axis (e.g., the y-axis or the folding axis (axis A) in FIG. 2A) in the folding area 315 of the electronic device 300.

As mentioned above, the substrate part 370 may include a first substrate 371 disposed in the first bracket 351 and a second substrate 373 disposed in the second bracket 353. The first substrate 371 and the second substrate 373 may be disposed inside a space formed by the bracket assembly 350a, the first housing structure 331, the second housing structure 333, the first rear cover 335, and the second rear cover 337. Components for implementing various functions of the electronic device 300 may be mounted on the first substrate 371 and the second substrate 373.

The first housing structure 331 and the second housing structure 333 may be assembled to each other so as to be coupled to both sides of the bracket assembly 350a in the state in which the display unit 310a is coupled to the bracket assembly 350a. As will be described later, the first housing structure 331 and the second housing structure 333 may be coupled to the bracket assembly 350a by sliding from both sides of the bracket assembly 350a.

In an embodiment, the first housing structure 331 may include a first rotation support surface 331a, and the second housing structure 333 may include a second rotation support surface 333a corresponding to the first rotation support surface 331a. The first rotation support surface 331a and the second rotation support surface 333a may include curved surfaces corresponding to the curved surfaces included in the hinge cover 350.

In an embodiment, when the electronic device 300 is in the flat state (e.g., the state shown in FIG. 2A), the first rotation support surface 331a and the second rotation support surface 333a may cover the hinge cover 350 so that the hinge cover 350 may not be exposed through the rear surface of the electronic device 300 or may be minimally exposed. On the other hand, when the electronic device 300 is in the folded state (e.g., the state shown in FIG. 2B), the first rotation support surface 331a and the second rotation support surface 333a may rotate along the curved surfaces included in the hinge cover 350 so that the hinge cover 350 may be maximally exposed through the rear surface of the electronic device 300.

Hereinafter, an example structure of an electronic device to which various embodiments related to the disclosure are applicable will be described with reference to FIGS. 2A, 2B, and 3. However, FIGS. 2A, 2B, and 3 only show an example of the structure of the electronic device, and the structure of the electronic device is not limited to the structure shown in FIGS. 2A, 2B, and 3. For example, the electronic device may have a folding structure in which a housing is divided into three or more areas by providing a plurality of hinge structures.

Figure 4:
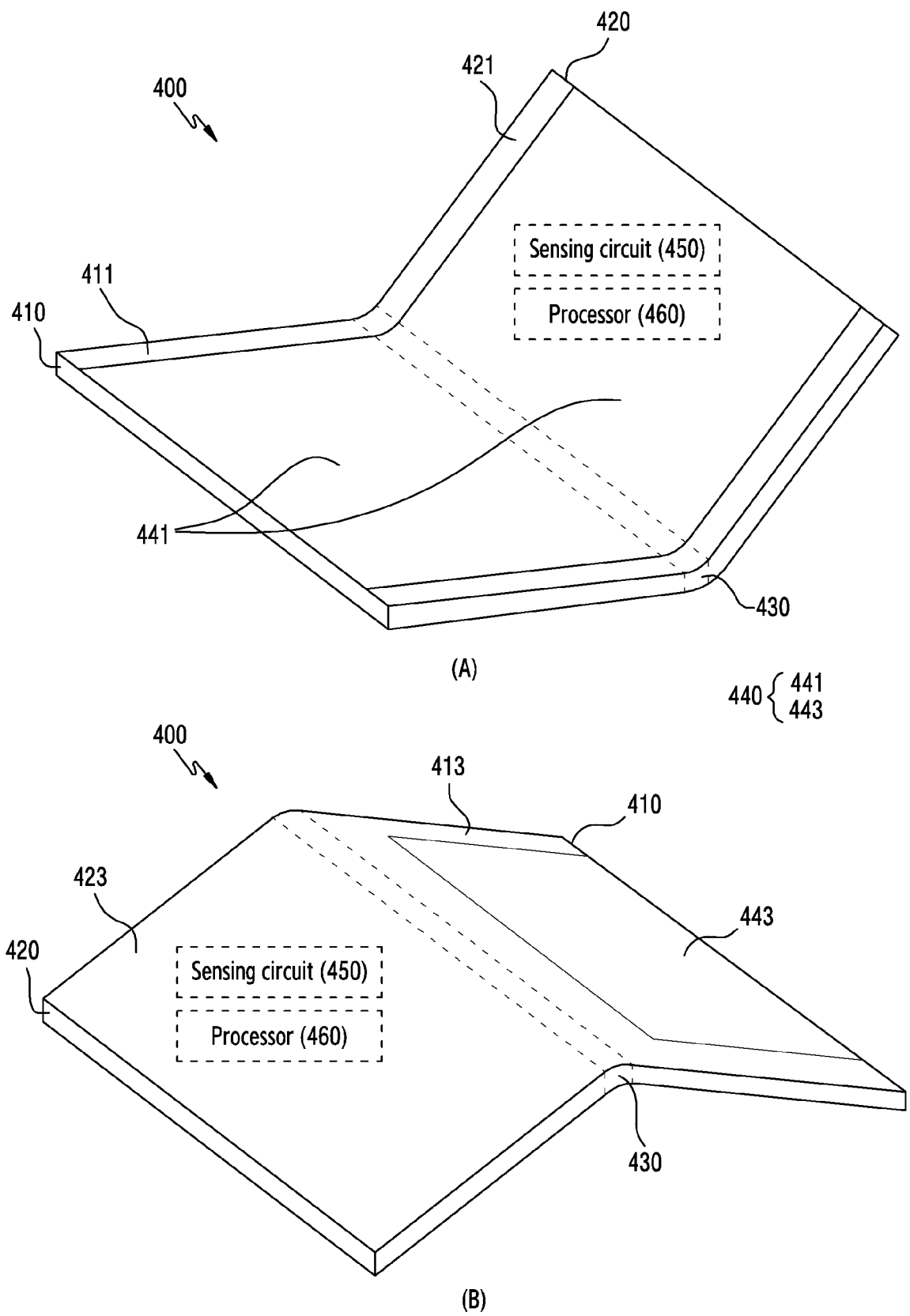
FIG. 4 is a diagram illustrating front and rear surfaces of an electronic device according to various embodiments

FIG. 4 is a diagram illustrating front and rear surfaces of an electronic device according to various embodiments.

Referring to FIG. 4, an electronic device 400 (e.g., a foldable phone) according to an embodiment may display a screen on a display 440, based on at least one of a folding operation and a physical movement of the electronic device 400. For example, the electronic device 400 according to an embodiment, while displaying a first execution screen (e.g., a game screen) according to execution of a first application (e.g., a game program) on the display 440, may identify occurrence of an event (e.g., message notification) of a second application (e.g., a messaging service program). If the occurrence of the event is identified, the electronic device 400 according to an embodiment may display a second execution screen related to the event (e.g., a message screen or a screen related to message content) on the display 440, based on at least one of a folding operation and a physical movement of the electronic device 400.

According to an embodiment, in order to display a screen corresponding to the occurrence of an event on the display 440, based on at least one of the folding operation and the physical movement, the electronic device 400 may include at least one of a first housing 410, a second housing 420, a display 440, a sensing circuit 450, and a processor (e.g., including processing circuitry) 460.

According to an embodiment, the first housing 410 (e.g., the first housing structure 231 in FIGS. 2A and 2B) may be disposed on one side of a folding axis (e.g., the folding axis (axis A) in FIGS. 2A and 2B) of a folding area 430. In an embodiment, the first housing 410 may include a first surface 411 and a second surface 413 disposed in opposite directions to each other. For example, the first housing 410 may include at least one recess in which a portion of the display 440 is disposed on the first surface 411 and the second surface 413.

According to an embodiment, the second housing 420 (e.g., the second housing structure 520 in FIGS. 2A and 2B) may be disposed on the opposite side of the first housing 410 with respect to the folding axis (e.g., the folding axis (axis A) in FIGS. 2A and 2B) of the folding area 430. For example, one of a folded state and a flat state of the electronic device 400 may be determined depending on an angle that the second housing 420 and the first housing 410 form therebetween about the folding axis of the folding area 430. In an embodiment, the second housing 420 may include a third surface 421 and a fourth surface 423 disposed in opposite directions to each other. In an embodiment, the second housing 420 may include a recess in which the remaining portion of the display 440 is disposed on the third surface 421. The recess formed on the third surface 421 of the second housing 420 may be configured to surround, for example, a portion of the side surface of the display 440. The recess formed in the first surface 411 of the first housing 410 may be configured to surround, for example, the remaining portion of the side surface of the display 440.

According to an embodiment, when the electronic device 400 is in a flat state, the first housing 410 and the second housing 420 may form an angle of 180 degrees therebetween and may be disposed to face in the same direction.

According to an embodiment, when the electronic device 400 is in a folded state, the first housing 410 and the second housing 420 may form an angle of 0 degrees to 10 degrees therebetween and may be disposed such that the first surface 411 and the third surface 421 face each other.

According to an embodiment, if the angle between the first housing 410 and the second housing 420 changes from 180 degrees (or 0 degrees to 10 degrees) to 0 degrees to 10 degrees (or 180 degrees), the electronic device 400 may determine that a folding operation has been performed from the flat state (or the folded state) to the folded state (or the flat state).

According to an embodiment, the display 440 (e.g., the display 210 in FIG. 2A and the display 290 in FIG. 2A) may include a first display area 441 and a second display area 443. In an embodiment, the first display area 441 of the display 440 may be disposed on both the first surface 411 of the first housing 410 and the third surface 421 of the second housing 420. In this case, at least a portion of the first display area 441 may be disposed in the recesses of the first housing 410 and the second housing 420. In an embodiment, in association with at least one of a folded state and a flat state of the electronic device 400, the first display area 441 may be formed in a flat surface (e.g., in the flat state) or a curved surface (e.g., in the folded state) about the folding area 430. In an embodiment, the second display area 443 of the display 440 may be disposed on the second surface 413 of the first housing 410. In this case, at least a portion of the second display area 443 may be disposed in the recess of the first housing 410. For example, the second display area 443 may be an area that is independent of the first display area 441 in its shape. Alternatively, the second display area 443 may be an area extending from the first display area 441.

According to an embodiment, the first display area 441 and the second display area 443 of the display 440 may be controlled by different display driver ICs (DDIs) from each other. For example, the first display area 441 may be controlled by a first display driver IC, and the second display area 443 may be controlled by a second display driver IC. In an embodiment, the electronic device 400 may detect at least one of a folding operation and a physical movement of the electronic device 400 while displaying a first execution screen (e.g., a game screen) according to execution of a first application (e.g., a game application) on the first display area 441 using the first display driver IC. In addition, as the electronic device 400 detects at least one of a folding operation and a physical movement, the electronic device 400 may display a second execution screen (e.g., a message screen or a screen related to message content) according to execution of a second application (e.g., a messaging service program) on the second display area 443 using the second display driver IC. In an embodiment, the first display driver IC and the second display driver IC may include the same or similar elements but may be different in that they control different display areas (e.g., the first display area 441 and the second display area 443) from each other.

According to an embodiment, the sensing circuit 450 may sense at least one of a folding operation between the first housing 410 and the second housing 420 and a physical movement of the electronic device 400.

According to an embodiment, the sensing circuit 450 may sense a folding operation according to a change in the angle between the first housing 410 and the second housing 420. For example, if the first housing 410 and the second housing 420 switch from the flat state (or the folded state) to the folded state (or the flat state), the sensing circuit 450 may sense that a folding operation has occurred, thereby generating a folding sensing signal. In an embodiment, the sensing circuit 450 may include a sensor (e.g., an acceleration sensor, an angular velocity sensor, a geomagnetic sensor, a Hall sensor, a rotation angle sensor, or a light sensor) disposed in at least one of the first housing 410 and the second housing 420.

According to an embodiment, the sensing circuit 450 may sense a physical movement of the electronic device 400 according to an external force generated in the electronic device 400. For example, if the first housing 410 is moved from a first position (e.g., the left or bottom) to a second position (e.g., the right or top) and if the second housing 420 is moved from the second position to the first position by an external force (e.g., a user's hand operation), the sensing circuit 450 may sense that a physical movement (e.g., shaking) has occurred by the movement, thereby generating a movement sensing signal. In an embodiment, the sensing circuit 450 may include a motion sensing sensor (e.g., an acceleration sensor or an angular velocity sensor) disposed in at least one of the first housing 410 and the second housing 420.

According to an embodiment, the processor 460 may include various processing circuitry perform control to display a screen, based on at least one of the folding operation between the first housing 410 and the second housing 420 or the physical movement of the electronic device 400. For example, the processor 460 may perform control to receive at least one of a folding sensing signal and a movement sensing signal from the sensing circuit 450 and display a screen on the second display area 443 (or the first display area 441).

According to an embodiment, the processor 460 may perform control to display a first execution screen (e.g., a game screen) according to execution of a first application (e.g., a game program) on the first display area 441. The processor 460 may monitor whether the event (e.g., message notification) occurs while the first execution screen is being displayed on the first display area 441. The processor 460 may receive at least one of a folding sensing signal and a movement sensing signal from the sensing circuit 450 after the event occurs. The processor 460, in response to at least one of the folding sensing signal and the movement sensing signal, may perform control to display a second execution screen (e.g., a message screen or a screen related to message content) related to the event on the second display area 443 while maintaining the execution of the first application. For example, the processor 460 may perform control to continue to display the first execution screen on the first display area 441 even though the second execution screen is displayed on the second display area 443.

According to an embodiment, if the screen of the display 400 changes (e.g., the screen switches from a first screen to a second screen), the processor 460 may block or invalidate a touch input received through the first display area 441. In order to block or invalidate a touch input received through the first display area 441, the processor 460 may inactivate a touch sensor disposed in the first display area 441. For example, the processor 460 may receive at least one of a folding sensing signal and a movement sensing signal from the sensing circuit 450 while displaying the first execution screen on the first display area 441. In this case, when the processor 460 displays the second execution screen on the second display area 443 in response to at least one of the folding sensing signal and the movement sensing signal, the processor 460 may configure a touch input to the first display area 441 to be inactive.

According to an embodiment, if the screen of the display 400 changes, the processor 460 may configure a power mode of the first application as a specified power mode. For example, the processor 460 may receive at least one of a folding sensing signal and a movement sensing signal from the sensing circuit 450 while displaying a first execution screen (e.g., a game screen) on the first display area 441. In this case, when the processor 460 displays a second execution screen (e.g., a message screen or a screen related to message content) on the second display area 443 in response to at least one of the folding sensing signal and the movement sensing signal, the processor 460 may execute the first application in a low power mode.

According to an embodiment, the processor 460 may configure an execution state of the first application depending on the type of the first application. For example, the processor 460 may receive at least one of a folding sensing signal and a movement sensing signal from the sensing circuit 450 while displaying a first execution screen (e.g., a video playback screen) according to execution of a first application related to playback of a video on the first display area 441. In this case, the processor 460 may display a second execution screen (e.g., a message screen or a screen related to message content) on the second display area 443 in response to at least one of the folding sensing signal and the movement sensing signal, and execute the first application (e.g., a program related to playback of a video) in a pause state. For example, if a message is received during playback of a video and if the electronic device is folded or turned over, the processor 460 may pause the video being played. If the electronic device is unfolded again or turned over to the original position, the processor 460 may resume playback of the video from the time at which it was paused.

According to an embodiment, the processor 460 may determine a screen displayed on the second display area 443, based on the direction of a physical movement sensed through the sensing circuit 450. For example, the processor 460 may receive a movement sensing signal including direction information of the physical movement (e.g., from left to right or from right to left) from the sensing circuit 450 while displaying a first execution screen (e.g., a game screen) on the first display area 441. In this case, the processor 460 may perform control to display a second execution screen (e.g., a message screen) according to execution of a second application (e.g., a messaging program) on the second display area 443 in response to the movement sensing signal, or display a third execution screen (e.g., a phone call screen) according to execution of a third application (e.g., a phone call program) related to an event (e.g., message notification). The second execution screen and the third execution screen may be screens in which different applications display at least one piece of information (e.g., a phone number) related to an event and information related to the information. In an embodiment, if a physical movement of the electronic device 400 rotating in the left-right direction (or horizontal direction) is sensed, the processor 460 may perform control to display a screen showing a received message along with information about a sender on the second display area 443. In an embodiment, if a physical movement of the electronic device 400 rotating in an up-down direction (or vertical direction) is sensed, the processor 460 may perform control to display a dialing screen for connection to a caller's phone number of the received message on the second display area 443.

According to an embodiment, the processor 460 may determine a display direction of the screen displayed on the second display area 443, based on the direction of a physical movement sensed through the sensing circuit 450. For example, the processor 460 may receive a movement sensing signal including direction information of a physical movement (e.g., a left-right direction or up-down direction) from the sensing circuit 450 while displaying a first execution screen (e.g., a game screen) on the first display area 441. In this case, in response to the movement sensing signal, the processor 460 may determine the direction in which second execution screen (e.g., a message screen) is displayed on the second display area 443. For example, if the electronic device is turned over by rotating in the left-right direction, the processor 460 may perform rendering by reversing the second execution screen left and right. In the case where the electronic device is turned over by rotating in up-down direction, the processor 460 may perform rendering by reversing the second execution screen up and down.

Figure 5:
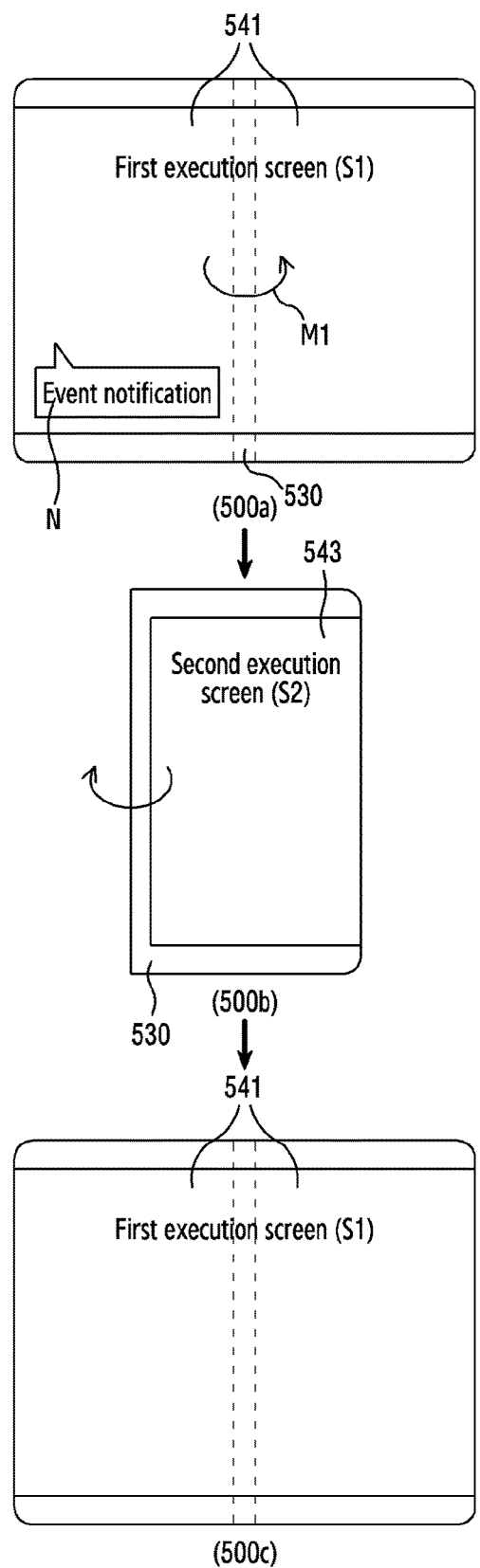
FIG. 5 is a diagram illustrating an operation in which an electronic device displays a screen according to various embodiments.

FIG. 5 is a diagram illustrating an example operation in which an electronic device displays a screen according to various embodiments. At least one of the elements of the electronic device illustrated in FIG. 5 may be the same as or similar to at least one of the elements of the electronic device illustrated in FIGS. 1 to 4, and redundant descriptions thereof may not be repeated.

Referring to FIG. 5, an electronic device 500 (e.g., the electronic device 400 in FIG. 4) according to an embodiment may display a first execution screen (e.g., a game screen) of a first application (e.g., a game program) and a second execution screen (e.g., a message screen or a screen related to message content) of a second application (e.g., a messaging service program), based on a folding operation, on a display (e.g., the display 440 in FIG. 4).

According to an embodiment, the electronic device 500 in the state 500a may display a first execution screen S1 (e.g., a game screen) according to execution of a first application (e.g., a game program) on a first display area 541 (e.g., the first display area 441 in FIG. 4). In an embodiment, the electronic device 500 may identify occurrence of an event N (e.g., message notification) related to a second application (e.g., a messaging service program) in the state in which the first execution screen S1 is displayed on the first display area 541. The event N may be displayed, for example, on a partial area of the first display area 541 in which the first execution screen S1 is displayed. In an embodiment, the electronic device 500 may sense a folding operation M1 in which the first display area 541 is folded based on a folding area 530 (e.g., the folding area 430 in FIG. 4) after the event N is displayed on the first display area 541.

According to an embodiment, in response to the folding operation M1 in the state 500a, the electronic device 500 may display a second execution screen S2 according to execution of a second application (e.g., a messaging service program) on the second display area 543 (e.g., the second display area 443 in FIG. 4) in the state 500b. In this case, the electronic device 500 may display the second execution screen S2 on the second display area 543 while maintaining the execution of the first application (e.g., a game program). In an embodiment, after displaying the second execution screen S2 on the second display area 543, the electronic device 500 may sense a folding operation in the opposite direction of the folding operation M1 in the state 500a.

According to an embodiment, in response to the folding operation in the state 500b (e.g., a folding operation in the opposite direction of the folding operation M1 in the state 500a), the electronic device 500 may display a first execution screen S1 on the first display area 541 in the state 500c. In this case, the electronic device 500 may display, on the first display area 541, the first execution screen S1 of the first application (e.g., a game screen) that is maintained to be executed even in the state 500b.

According to various embodiments, in response to the folding operation M1 in the state 500a, the electronic device 500 may store operation content of the first application (e.g., a media player) (e.g., a background operation) and display the second execution screen S2 on the second display area 543 in the state 500b. In response to the folding operation in the state 500b (e.g., a folding operation in the opposite direction of the folding operation M1 in the state 500a), the electronic device 500 may display the first execution screen S1 related to the stored content (e.g., a foreground operation) in the state 500c.

Figure 6:
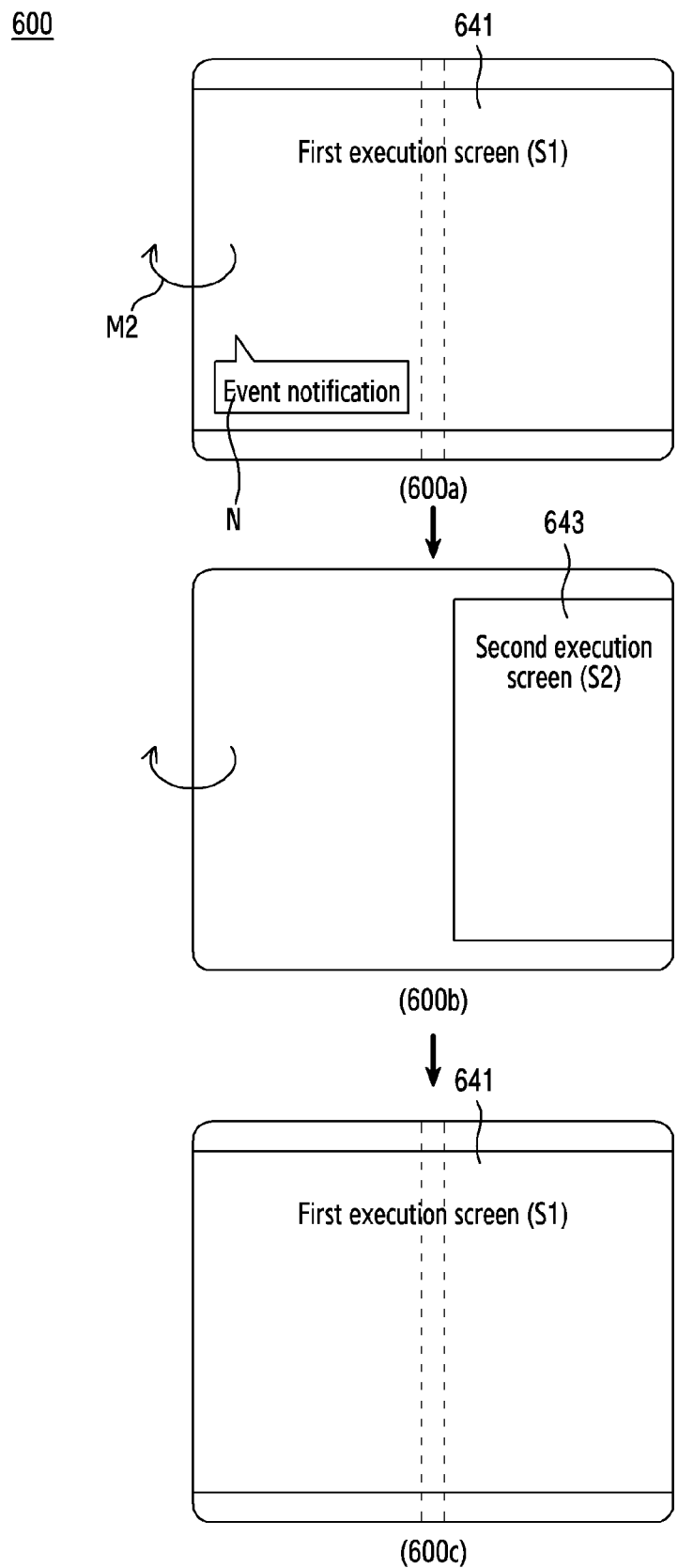
FIG. 6 is a diagram illustrating an operation in which an electronic device displays a screen according to various embodiments.

FIG. 6 is a diagram illustrating an example operation in which an electronic device displays a screen according to various embodiments. At least one of the elements of the electronic device illustrated in FIG. 6 may be the same as or similar to at least one of the elements of the electronic device illustrated in FIGS. 1 to 4, and redundant descriptions thereof may not be repeated.

Referring to FIG. 6, an electronic device 600 (e.g., the electronic device 400 in FIG. 4) according to an embodiment may display a first execution screen (e.g., a game screen) of a first application (e.g., a game program) and a second execution screen (e.g., a message screen or a screen related to message content) of a second application (e.g., a messaging service program), based on a physical movement, on a display (e.g., the display 440 in FIG. 4).

According to an embodiment, the electronic device 600 in the state 600a may display a first execution screen S1 (e.g., a game screen) according to execution of a first application (e.g., a game program) on a first display area 641 (e.g., the first display area 441 in FIG. 4). In an embodiment, the electronic device 600 may identify occurrence of an event N (e.g., message notification) related to a second application (e.g., a messaging service program) in the state in which the first execution screen S1 is displayed on the first display area 641. The event N may be displayed, for example, on a partial area of the first display area 641 in which the first execution screen S1 is displayed. In an embodiment, the electronic device 600 may sense a physical movement M2 in which the position of the electronic device 600 is moved according to an external force (e.g., a user's hand operation) produced in the electronic device 600 after the event N is displayed on the first display area 641. For example, the electronic device 600 may perform a rotating operation according to the physical movement M2, thereby switching to the state in which the position of a first housing (e.g., the first housing 410 in FIG. 4) and the position of a second housing (e.g., the second housing 420 in FIG. 4) are reversed as shown in the state 600b.

According to an embodiment, in response to the physical movement M2 in the state 600a, the electronic device 600 may display a second execution screen S2 according to execution of a second application (e.g., a messaging service program) on a second display area 643 (e.g., the second display area 443 in FIG. 4) in the state 600b. In this case, the electronic device 600 may display the second execution screen S2 on the second display area 643 while maintaining the execution of the first application (e.g., a game program). In an embodiment, after displaying the second execution screen S2 on the second display area 643, the electronic device 600 may sense a physical movement in the opposite direction of the physical movement M2 in the state 600a.

According to an embodiment, in response to the physical movement in the state 600b (e.g., a physical movement in the opposite direction of the physical movement M2 in the state 600a), the electronic device 600 may display a first execution screen S1 on the first display area 641 in the state 600c. In this case, the electronic device 600 may display, on the first display area 641, the first execution screen S1 of the first application (e.g., a game program) that is maintained to be executed even in the state 600b.

According to various embodiments, if the electronic device 600 in the state 600b detects consecutive physical movements M2 in the state 600a, the electronic device 600 may display the first execution screen S1 in the state 600c, replacing the physical movement in the opposite direction of the physical movement M2 in the state 600a.

Figure 7:
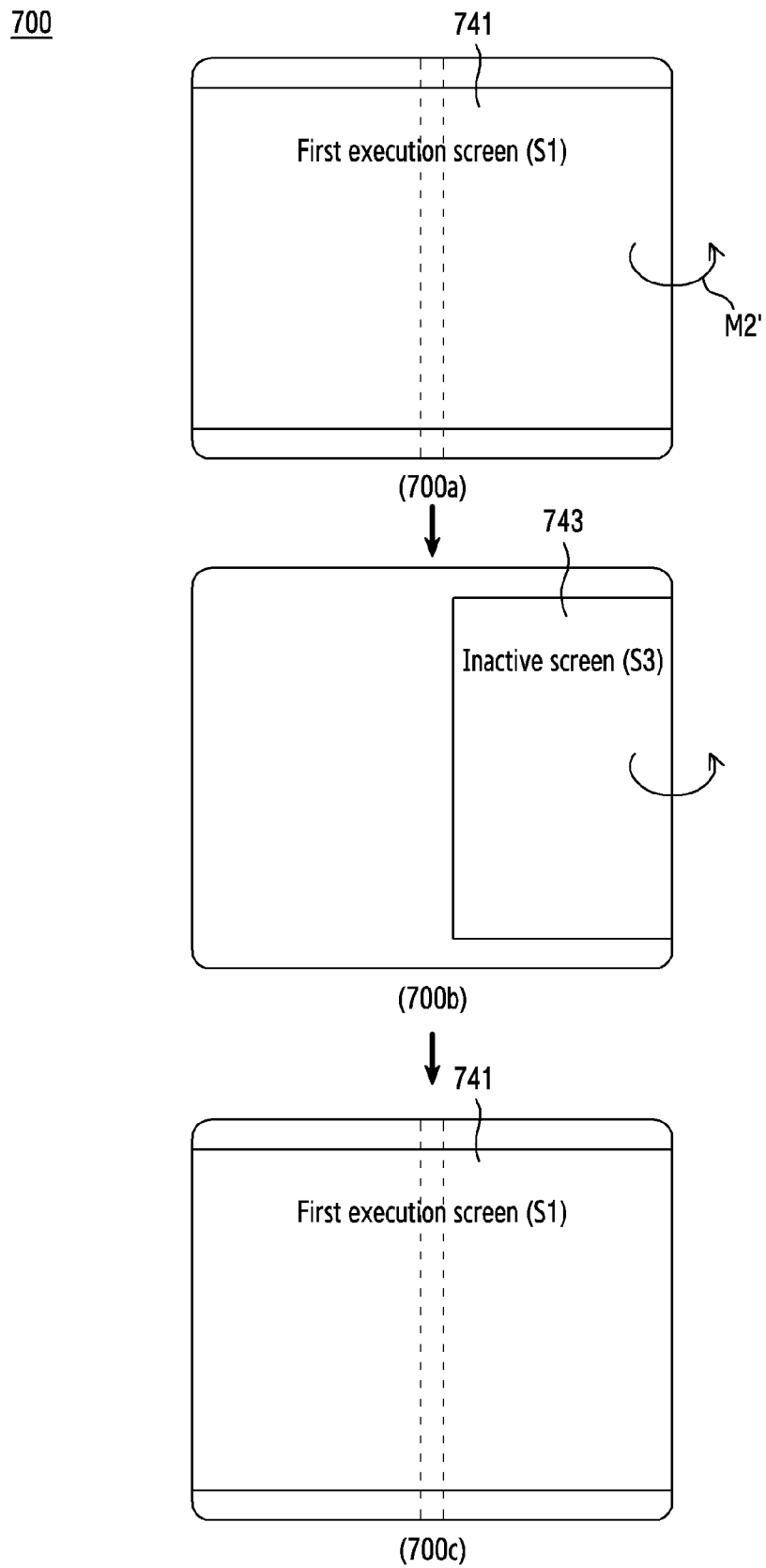
FIG. 7 is a diagram illustrating a state in which an electronic device displays a screen according to various embodiments.

FIG. 7 is a diagram illustrating an example in which an electronic device displays a screen according to various embodiments. At least one of the elements of the electronic device illustrated in FIG. 7 may be the same as or similar to at least one of the elements of the electronic device illustrated in FIGS. 1 to 4, and redundant descriptions thereof may not be repeated.

Referring to FIG. 7, an electronic device 700 (e.g., the electronic device 400 in FIG. 4) according to an embodiment, based on a physical movement, may configure a second display area 743 to be in an inactive state (e.g., a screen-off state) in the state in which execution of a first application (e.g., a video playback program) is maintained in a specified state (e.g., a pause state).

According to an embodiment, in the state 700a, the electronic device 700 may display a first execution screen S1 (e.g., a video playback screen) according to execution of a first application (e.g., a video playback program) on a first display area 741 (e.g., the first display area 441 in FIG. 4). In an embodiment, the electronic device 700 may sense a physical movement M2' (e.g., a physical movement in the opposite direction of the physical movement M2 in FIG. 6) in which the position of the electronic device 700 is moved according to an external force (e.g., a user's hand operation) produced in the electronic device 700. For example, the electronic device 700 may perform a rotating operation according to the physical movement M2', thereby switching to the state in which the position of a first housing (e.g., the first housing 410 in FIG. 4) and the position of a second housing (e.g., the second housing 420 in FIG. 4) are reversed as shown in the state 700b.

According to an embodiment, in response to the physical movement M2' in the state 700a, the electronic device 700 may maintain an inactive screen S3 on the second display area 743 (e.g., the second display area 443 in FIG. 4) in the state 700b. In this case, the electronic device 700 may maintain the inactive screen S3 on the second display area 743 while maintaining or pausing the execution of the first application (e.g., a game program). In an embodiment, the electronic device 700 may sense a physical movement in the opposite direction of the physical movement M2' in the state 700a in the state in which the inactive screen S3 is maintained on the second display area 743.

According to an embodiment, in response to the physical movement in the state 700b (e.g., a physical movement in the opposite direction of the physical movement M2' in the state 700a), the electronic device 700 may display the first execution screen S1 on the first display area 741 in the state 700c. In this case, the electronic device 700 may switch the first application (e.g., a video playback program) the execution of which is maintained in the pause state in the state 700b to a playback state, thereby displaying the first execution screen S1 on the first display area 741.

According to various embodiments, if the electronic device 700 in the state 700b detects consecutive physical movements M2' in the state 700a, the electronic device 600 may display the first execution screen S1 in the state 700c, replacing the physical movement in the opposite direction of the physical movement M2' in the state 700a.

Figure 8:
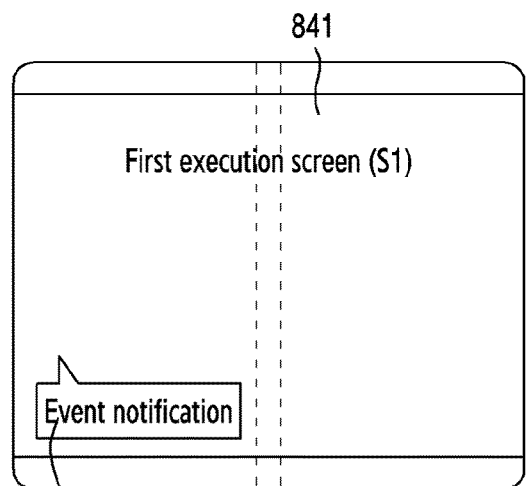
FIG. 8 is a diagram illustrating a state in which an electronic device displays a screen according to various embodiments.
Figure 8:
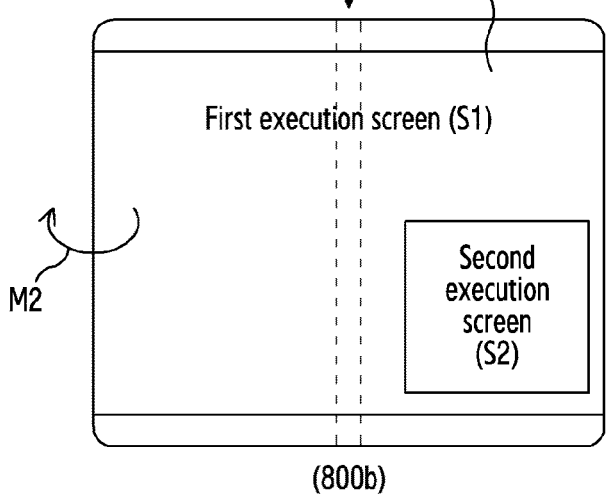
Figure 8:
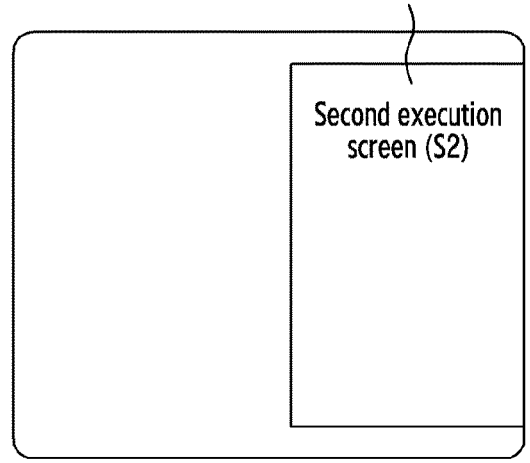

FIG. 8 is a diagram illustrating an example in which an electronic device displays a screen according to various embodiments. At least one of the elements of the electronic device illustrated in FIG. 8 may be the same as or similar to at least one of the elements of the electronic device illustrated in FIGS. 1 to 4, and redundant descriptions thereof may not be repeated.

Referring to FIG. 8, an electronic device 800 (e.g., the electronic device 400 in FIG. 4) according to an embodiment may display a first execution screen (e.g., a game screen) of a first application (e.g., a game program) and a second execution screen (e.g., a message screen or a screen related to message content) of a second application (e.g., a messaging service program), based on a physical movement, on a display (e.g., the display 440 in FIG. 4).

According to an embodiment, in the state 800a, the electronic device 800 may display a first execution screen S1 (e.g., a game screen) according to execution of a first application (e.g., a game program) on a first display area 841 (e.g., the first display area 441 in FIG. 4). In an embodiment, the electronic device 800 may identify occurrence of an event N (e.g., message notification) related to a second application (e.g., a messaging service program) in the state in which the first execution screen S1 is displayed on the first display area 841. The event N may be displayed, for example, on a partial area of the first display area 841 on which the first execution screen S1 is displayed. For example, the electronic device 800 may display an event N, which occurs while displaying the first execution screen S1 on the first display area 841, on a partial area of the first execution screen S1 in the form of an overlay or in the form of a multi-window (e.g., in a form in which the first display area 841 is divided into a plurality of areas) on the first display area 841, which is separated from the first execution screen S1.

According to an embodiment, in the state 800b, the electronic device 800, in response to a user input for receiving the event N (e.g., a touch onto the area where the event notification N is displayed), may display at least a portion of a second execution screen S2 on the first display area 841. In this case, the second execution screen S2 may share at least a portion of the first display area 841 with the first execution screen S1. For example, the electronic device 800 may display the second execution screen S2 on a partial area of the first execution screen S1 in the form of an overlay or in the form of a multi-window (e.g., in a form in which the first display area 841 is divided into a plurality of areas) on the first display area 841, which is separated from the first execution screen S1.

In an embodiment, the electronic device 800 may sense a physical movement M2 in which the position of the electronic device 800 is moved according to an external force (e.g., a user's hand operation) produced in the electronic device 800 after the event N is displayed on the first display area 841. For example, the electronic device 800 may perform a rotating operation according to the physical movement M2, thereby switching to the state in which the position of a first housing (e.g., the first housing 410 in FIG. 4) and the position of a second housing (e.g., the second housing 420 in FIG. 4) are reversed as shown in the state 800c.

According to an embodiment, in response to the physical movement M2 in the state 800b, the electronic device 800 may display a second execution screen S2 according to execution of a second application (e.g., a messaging service program) on a second display area 843 (e.g., the second display area 443 in FIG. 4) in the state 800c. In this case, the electronic device 800 may display the second execution screen S2 on the second display area 843 while maintaining the execution of the first application (e.g., a game program).

According to various embodiments, the electronic device 800 may switch to the state 800c, instead of displaying the second execution screen S2 on the first display area 841 in the state 800b, after the state 800a.

Figure 9:
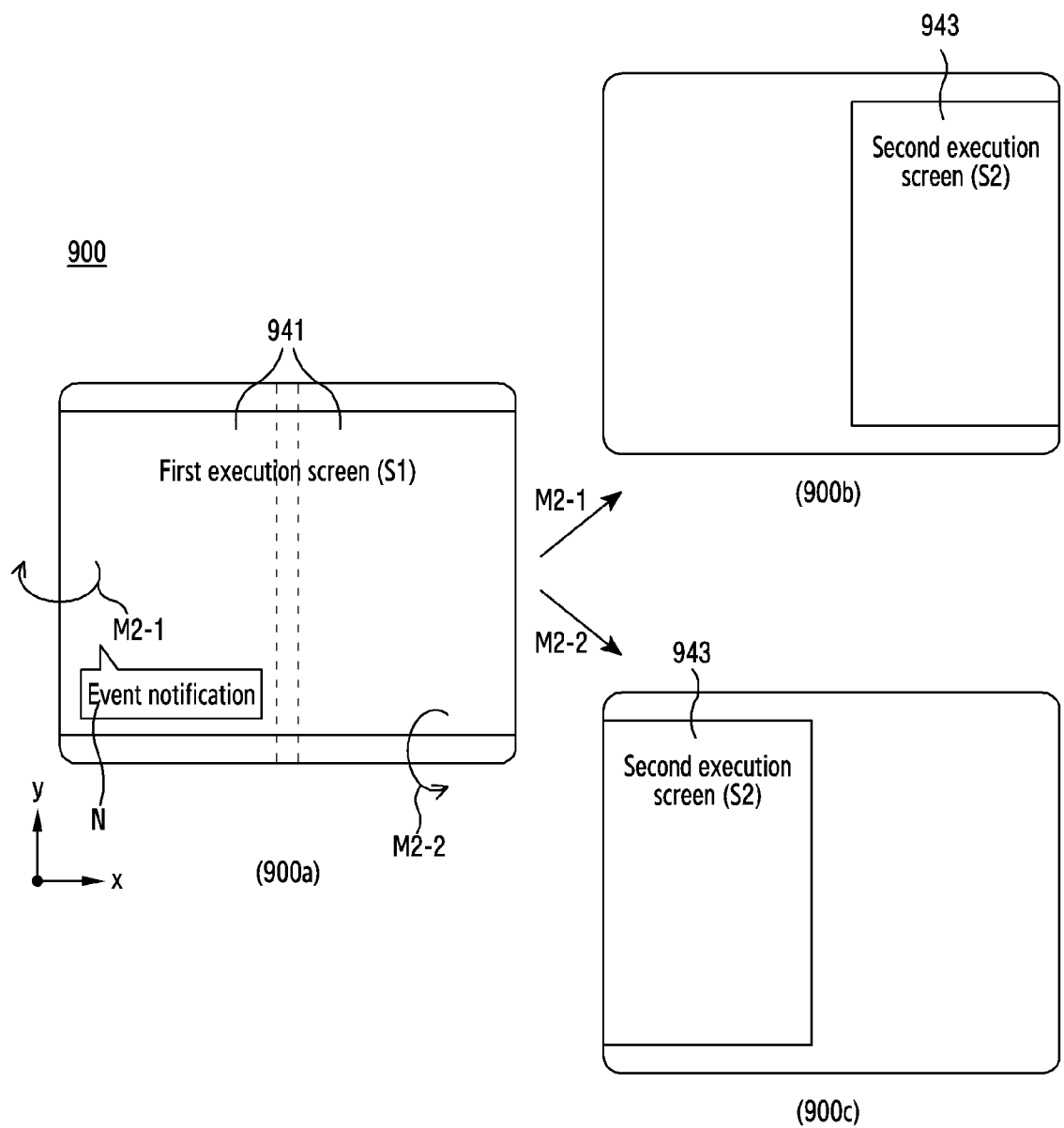
FIG. 9 is a diagram illustrating a state in which a screen is displayed depending on a rotational direction of an electronic device according to various embodiments.

FIG. 9 is a diagram illustrating an example in which a screen is displayed depending on a rotational direction of an electronic device according to an embodiment. At least one of the elements of the electronic device illustrated in FIG. 9 may be the same as or similar to at least one of the elements of the electronic device illustrated in FIGS. 1 to 4, and redundant descriptions thereof may not be repeated.

Referring to FIG. 9, an electronic device 900 (e.g., the electronic device 400 in FIG. 4) according to an embodiment may display a first execution screen (e.g., a game screen) of a first application (e.g., a game program) and a second execution screen (e.g., a message screen or a screen related to message content) of a second application (e.g., a messaging service program), based on a physical movement, on a display (e.g., the display 440 in FIG. 4). In an embodiment, the electronic device 900 may determine the display direction of a screen displayed on a second display area 943, based on the direction of the physical movement.

According to an embodiment, in the state 900a, the electronic device 900 may display a first execution screen S1 (e.g., a game screen) according to execution of a first application (e.g., a game program) on a first display area 941 (e.g., the first display area 441 in FIG. 4). In an embodiment, the electronic device 900 may identify occurrence of an event N (e.g., message notification) related to a second application (e.g., a messaging service program) in the state in which the first execution screen S1 is displayed on the first display area 941. The event N may be displayed, for example, on a partial area of the first display area 941 in which the first execution screen S1 is displayed. In an embodiment, the electronic device 900 may sense physical movements M2-1 and M2-2 in which the position of the electronic device 900 is moved in different directions according to an external force (e.g., a user's hand operation) produced in the electronic device 900 after the event N is displayed on the first display area 941. For example, the electronic device 900 may perform a rotating operation according to the physical movement M2-1 or M2-2, thereby switching to the state in which the position of a first housing (e.g., the first housing 410 in FIG. 4) and the position of a second housing (e.g., the second housing 420 in FIG. 4) are reversed as shown in one of the state 900b and the state 900c.

According to an embodiment, in response to the physical movement M2-1 in a first rotational direction (x-axis direction), the electronic device 900 may display a second execution screen S2 according to execution of a second application (e.g., a messaging service program) on a second display area 943 (e.g., the second display area 443 in FIG. 4) in the state 900b. In this case, the electronic device 900 may display the second execution screen S2 on the second display area 943 while maintaining the execution of the first application (e.g., a game program). In an embodiment, the electronic device 900 may determine the display direction of the second execution screen S2 to correspond to the physical movement M2-1 in the first rotational direction (x-axis direction). For example, the electronic device 900 may display the second execution screen S2 in a forward direction corresponding to the position of the second display 943 that was rotated in the first rotational direction (x-axis direction).

According to an embodiment, in response to the physical movement M2-2 in a second rotational direction (y-axis direction), the electronic device 900 may display a second execution screen S2 according to execution of a second application (e.g., a messaging service program) on a second display area 943 (e.g., the second display area 443 in FIG. 4) in the state 900c. In this case, the electronic device 900 may display the second execution screen S2 on the second display area 943 while maintaining the execution of the first application (e.g., a game program). In an embodiment, the electronic device 900 may determine the display direction of the second execution screen S2 to correspond to the physical movement M2-2 in the second rotational direction (y-axis direction). For example, the electronic device 900 may display the second execution screen S2 in a forward direction corresponding to the position of the second display 943 that was rotated in the second rotational direction (y-axis direction).

Figure 10:
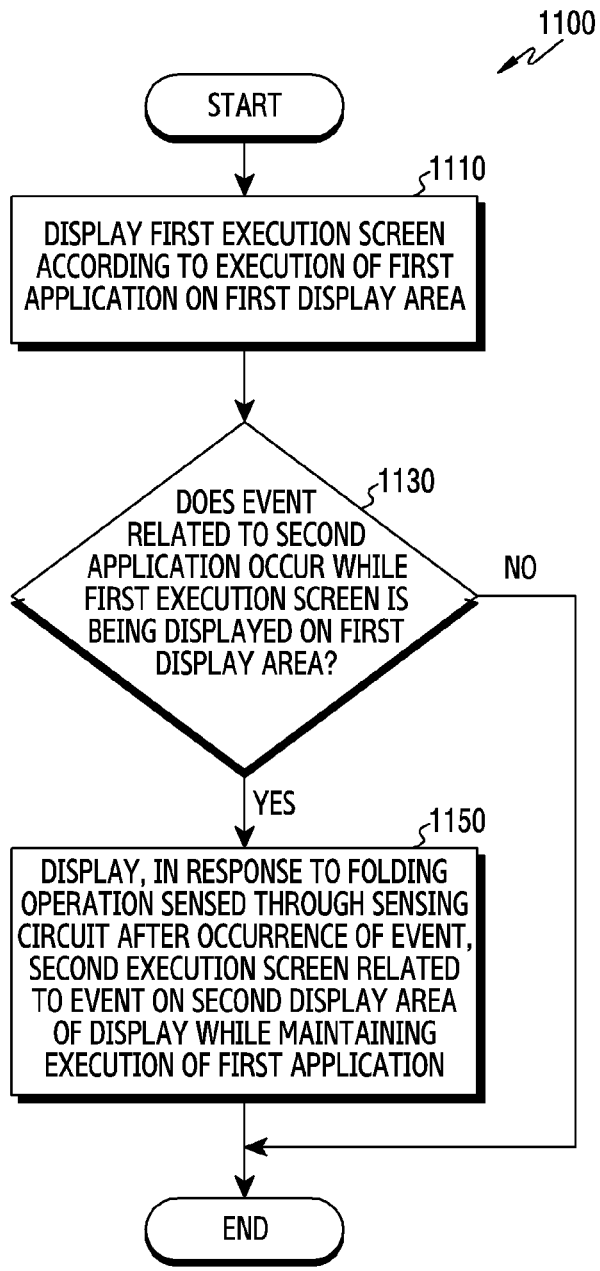
FIG. 10 is a flowchart illustrating an example method of displaying a screen in response to a first movement of an electronic device according to various embodiments.

FIG. 10 is a flowchart illustrating an example method 1100 of displaying a screen in response to a first movement of an electronic device according to various embodiments. At least one of the elements of the electronic device illustrated in FIG. 10 may be the same as or similar to at least one of the elements of the electronic device illustrated in FIGS. 1 to 4, and redundant descriptions thereof may not be repeated.

Referring to FIG. 10, an electronic device (e.g., the electronic device 400 in FIG. 4) according to an embodiment may change a screen, based on a folding operation of the electronic device 400. For example, the electronic device 400 according to an embodiment, while displaying a first execution screen (e.g., a game screen) produced by executing a first application (e.g., a game program) on a display (e.g., the display 440 in FIG. 4), may identify occurrence of an event (e.g., message notification) related to a second application (e.g., a messaging service program). If the occurrence of the event is identified, the electronic device 400 according to an embodiment may further display a second execution screen related to the event (e.g., a message screen or a screen related to message content) on the display 440, based on a folding operation of the electronic device 400.

Referring to operation 1110, a processor (e.g., the processor 460 in FIG. 4) according to an embodiment may perform control to display a first execution screen (e.g., a game screen) produced by executing a first application (e.g., a game program) on a first display area (e.g., the first display area 441 in FIG. 4).

Referring to operation 1130, the processor 460 according to an embodiment may monitor whether an event (e.g., message notification) related to a second application (e.g., a messaging service program) occurs while the first execution screen is being displayed on the first display area (e.g., the first display area 441 in FIG. 4). In an embodiment, the processor 460 may perform operation 1150 if the event occurs, and may end operation 1130 (e.g., repeat operation 1110) if the event does not occur.

Referring to operation 1150, the processor 460 according to an embodiment may identify a folding operation through a sensing circuit (e.g., the sensing circuit 450 in FIG. 4) after the event occurs (e.g., based on the event occurring). In an embodiment, in response to the folding operation, the processor 460 may perform control to display a second execution screen (e.g., a message screen or a screen related to message content) related to the event on a second display area (e.g., the second display area 443 in FIG. 4) while maintaining the execution of the first application (e.g., a game program). For example, even if the second execution screen is displayed on the second display area 443, the processor 460 may perform control to continue to display the first execution screen on the first display area 441.

According to various embodiments, if a response is made to the event (e.g., a touch is made onto an area where a message notification is displayed), the processor 460 may perform control to display a second execution screen (e.g., a message screen or a screen related to message content) related to the event on the second display area 443. In various embodiments, the processor 460 may perform control to display the second execution screen on the second display area 443 irrespective of occurrence of the folding operation. In addition, if a folding operation is sensed through the sensing circuit 450 after displaying the second execution screen on the second display area 443 in response to the event, the processor 460 may perform control to continue to display the second execution screen on the second display area 443.

Figure 11:
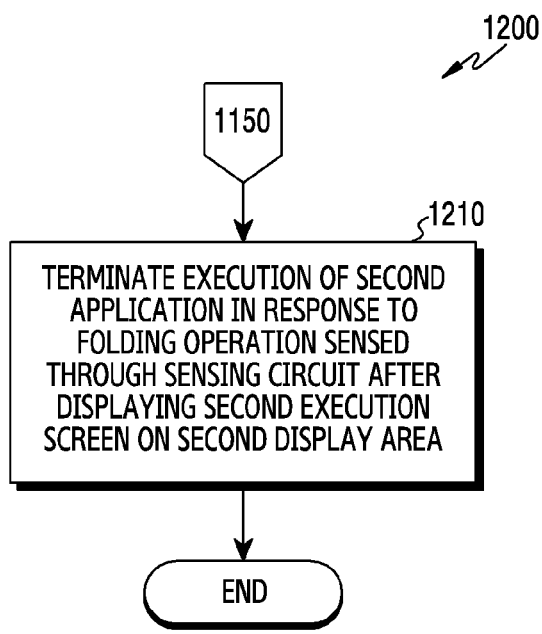
FIG. 11 is a flowchart illustrating an example operation of displaying a screen in response to a first movement of an electronic device according to various embodiments.

FIG. 11 is a flowchart illustrating an example operation of displaying a screen in response to a first movement of an electronic device according to various embodiments. At least one of the elements of the electronic device illustrated in FIG. 11 may be the same as or similar to at least one of the elements of the electronic device illustrated in FIGS. 1 to 4, and redundant descriptions thereof may not be repeated.

Referring to FIG. 11, in operation 1210, a processor (e.g., the processor 460 in FIG. 4) according to an embodiment may sense a folding operation through a sensing circuit (e.g., the sensing circuit 450 in FIG. 4) after displaying a second execution screen on a second display area (e.g., the second display area 443 in FIG. 4). In this case, the processor 460 may sense a folding operation in the opposite direction of the folding operation produced in operation 1150 in FIG. 10 through the sensing circuit 450. In an embodiment, the processor 460 may terminate the execution of the second application (e.g., a messaging service program) in response to the folding operation.

Figure 12:
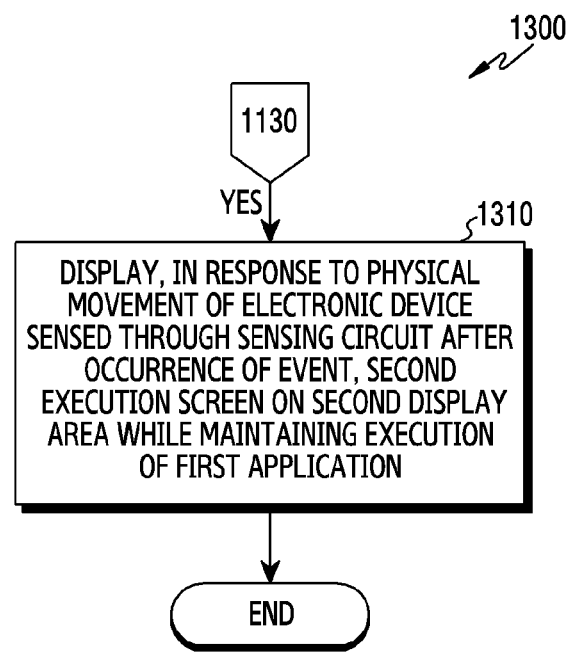
FIG. 12 is a flowchart illustrating an example operation of displaying a screen in response to a second movement of an electronic device according to various embodiments

FIG. 12 is a flowchart illustrating an example operation of displaying a screen in response to a second movement of an electronic device according to an embodiment. At least one of the elements of the electronic device illustrated in FIG. 12 may be the same as or similar to at least one of the elements of the electronic device illustrated in FIGS. 1 to 4, and redundant descriptions thereof may not be repeated.

Referring to FIG. 12, in operation 1310, a processor (e.g., the processor 460 in FIG. 4) according to an embodiment may sense a physical movement through a sensing circuit (e.g., the sensing circuit 450 in FIG. 4) after an event related to a second application (e.g., a messaging service program) occurs. In an embodiment, in response to the physical movement, the processor 460 may perform control to display a second execution screen (e.g., a message screen or a screen related to message content) related to the event on a second display area (e.g., the second display area 443 in FIG. 4) while maintaining the execution of the first application (e.g., a game program). For example, even if the second execution screen is displayed on the second display area 443, the processor 460 may perform control to continue to display the first execution screen on the first display area 441.

Figure 13:
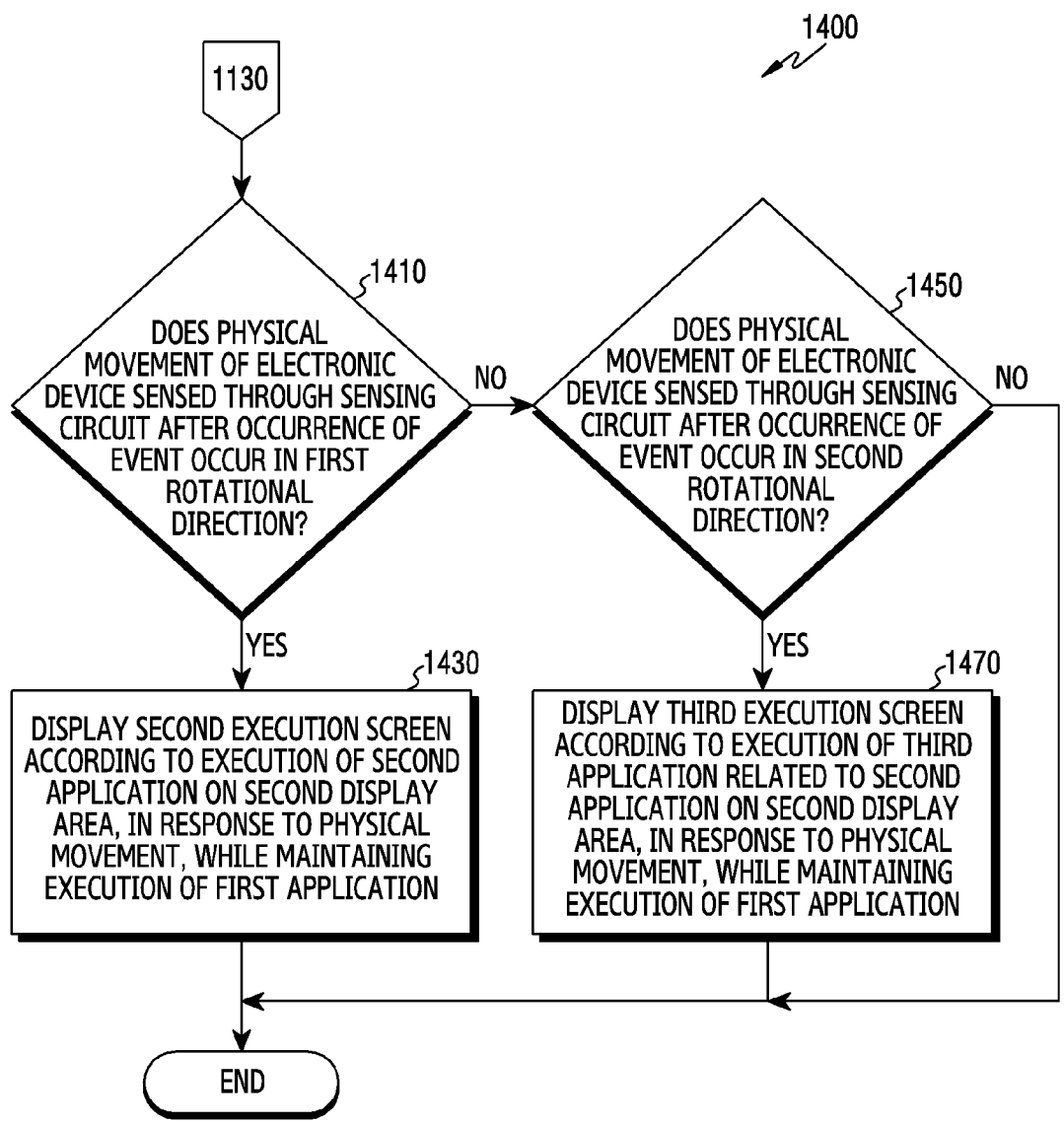
FIG. 13 is a flowchart illustrating an example operation of displaying a screen corresponding to a direction in which a first movement of an electronic device occurs according to various embodiments.

FIG. 13 is a flowchart illustrating example operations of displaying a screen corresponding to a direction in which a first movement of an electronic device occurs according to various embodiments. At least one of the elements of the electronic device illustrated in FIG. 13 may be the same as or similar to at least one of the elements of the electronic device illustrated in FIGS. 1 to 4, and redundant descriptions thereof may not be repeated.

Referring to FIG. 13, an electronic device (e.g., the electronic device 400 in FIG. 4) according to an embodiment may determine a screen displayed on the second display area 443, based on the direction of a physical movement through a sensing circuit (e.g., the sensing circuit 450 in FIG. 4), after an event (e.g., message notification) related to a second application (e.g., a messaging service program).

Referring to operation 1410, a processor (e.g., the processor 460 in FIG. 4) according to an embodiment may determine whether a physical movement occurs in a first rotational direction (e.g., from left to right) through the sensing circuit 450 after the occurrence of the event. For example, the processor 460 may perform operation 1430 if the physical movement sensed through the sensing circuit 450 occurs in the first rotational direction, and perform operation 1450 if the physical movement does not occur in the first rotational direction (e.g., when the physical movement occurs in a different direction).

Referring to operation 1430, if the physical movement occurs in the first rotational direction (e.g., from left to right), the processor 460 according to an embodiment may perform control to display a second execution screen (e.g., a message screen) according to execution of a second application (e.g., a messaging service program) on a second display area (e.g., the second display area 443 in FIG. 4), in response to the physical movement in the first rotational direction, while maintaining the execution of the first application (e.g., a game program).

Referring to operation 1450, the processor 460 according to an embodiment may determine whether a physical movement occurs in a second rotational direction (e.g., from right to left) through the sensing circuit 450 after the occurrence of the event. For example, the processor 460 may perform operation 1470 if the physical movement sensed through the sensing circuit 450 occurs in the second rotational direction, and terminate operation 1450 (e.g., repeat operation 1130) if the physical movement does not occur in the second rotational direction (e.g., no physical movement occurs in any direction).

Referring to operation 1470, if the physical movement occurs in the second rotational direction (e.g., from right to left), the processor 460 according to an embodiment may perform control to display a third execution screen (e.g., a phone call) according to execution of a third application related to the second application (e.g., a messaging service program) on the second display area 443, in response to the physical movement in the second rotational direction, while maintaining the execution of the first application (e.g., a game program).

According to various embodiments, the processor 460 may receive a movement sensing signal including direction information of the physical movement (e.g., from left to right or from right to left) from the sensing circuit 450 while displaying a first execution screen (e.g., a game screen) on the first display area 441. In this case, in response to the movement sensing signal, the processor 460 may perform control to display a second execution screen (e.g., a message screen) according to execution of a second application (e.g., a message program) on the second display area 443 or display a third execution screen (e.g., a phone call screen) according to execution of a third application (e.g., a phone call program) related to an event (e.g., a message notification).

According to various example embodiments, an electronic device may include: a first housing including a first surface and a second surface facing an opposite direction of the first surface, a second housing including a third surface disposed to face the first surface based on a rotational direction and a fourth surface in the opposite direction of the third surface, a hinge structure comprising a hinge configured to rotatably connect the first housing and the second housing, at least one display including a first display area disposed on at least one of the first surface and the third surface, and a second display area disposed on at least one of the second surface and the fourth surface, a sensing circuit configured to sense at least one of a folding operation between the first housing and the second housing and a physical movement of the electronic device, and a processor electrically connected to the display and the sensing circuit, wherein the processor may be configured to: control the display to display a first execution screen based on execution of a first application on the first display area, monitor whether an event related to a second application occurs while the first execution screen is displayed on the first display area, and display, in response to at least one of the folding operation sensed through the sensing circuit or a rotating operation of the electronic device identified from the physical movement after the occurrence of the event, a second execution screen related to the event on the second display area while the first application is being executed.

According to various example embodiments, the display may include a first display including the first display area and controlled by a first display driver IC (DDI), and a second display including the second display area and controlled by a second display driver IC.

According to various example embodiments, the at least one display may include a touch sensor configured to detect a touch input, and the processor may be configured, based on the second execution screen being displayed on the second display area while the first application is being executed in response to at least one of the folding operation and the physical movement sensed through the sensing circuit based on occurrence of the event, to deactivate a touch sensor corresponding to the first display area.

According to various example embodiments, the processor may be configured, in response to at least one of the folding operation and the physical movement sensed through the sensing circuit based on the occurrence of the event, to display the second execution screen on the second display area and execute the first application in a low-power mode configured to consume less power than before displaying the second execution screen on the second display area.

According to various example embodiments, the processor may be configured, based on the first application being a program related to playback of a video, to display the second execution screen on the second display area while pausing playback of a video by the first application in response to at least one of the folding operation and the physical movement sensed through the sensing circuit based on the event occurring.

According to various example embodiments, the processor may be configured to control the display to display, in response to an input for receiving the event based on occurrence of the event, at least a portion of the second execution screen on the first display area while the first application is being executed.

According to various example embodiments, the processor may be configured, based on the physical movement sensed through the sensing circuit based on occurrence of the event corresponding to a first rotational direction, to control the display to display the second execution screen according to the execution of the second application on the second display area while the first application is being executed.

According to various example embodiments, the processor may be configured, based on the physical movement sensed through the sensing circuit based on occurrence of the event corresponding to a second rotational direction, to control the display to display a third execution screen according to execution of a third application related to the event on the second display area while the first application is being executed, and the third application may be different from the second application, and the second execution screen and the third execution screen may include information related to the event.

According to various example embodiments, the processor may be configured to determine, in response to the physical movement sensed through the sensing circuit after the occurrence of the event, a direction for displaying the second execution screen on the second display area while the first application is being executed.

According to various example embodiments, the processor may be configured to terminate execution of the second application in response to at least one of the folding operation and the physical movement sensed through the sensing circuit based on displaying the second execution screen on the second display area.

According to various example embodiments, the processor may be configured to control the display to display, in response to at least one of the folding operation and the physical movement sensed through the sensing circuit based on occurrence of the event, a second execution screen related to the event on the first display area while the first application is being executed.

According to various example embodiments, the sensing circuit may include a folding detection sensor configured to sense a folding operation of the first housing and the second housing, and a motion detection sensor configured to detect a physical movement of the electronic device.

According to various example embodiments, a method of controlling a display may include: displaying a first execution screen according to execution of a first application on a first display area of a display, monitoring whether an event related to a second application occurs while the first execution screen is displayed on the first display area, and displaying, in response to at least one of a folding operation between a first housing and a second housing sensed through a sensing circuit based on occurrence of the event and a rotating operation of an electronic device being identified from a physical movement of the electronic device, a second execution screen related to the event on a second display area of the display while the first application is being executed.

According to various example embodiments, the displaying of the second execution screen on the second display area may include blocking or invalidating a touch input received through the first display area.

According to various example embodiments, the displaying of the second execution screen on the second display area may include executing the first application in a low-power mode that consumes less power than before displaying the second execution screen on the second display area.

According to various example embodiments, the displaying of the second execution screen on the second display area may include, based on the first application being a program related to playback of a video, displaying the second execution screen on the second display area while pausing playback of a video by the first application in response to at least one of the folding operation and the physical movement sensed through the sensing circuit after the event occurs.

According to various example embodiments, the displaying of the second execution screen on the second display area may include, based on the physical movement sensed through the sensing circuit based on occurrence of the event corresponding to a first rotational direction, displaying the second execution screen according to the execution of the second application on the second display area while the first application is being executed.

According to various example embodiments, the displaying of the second execution screen on the second display area may include, based on the physical movement sensed through the sensing circuit based on occurrence of the event corresponding to a second rotational direction, displaying a third execution screen according to execution of a third application related to the event on the second display area while the first application is being executed, and the third application may be different from the second application, and the second execution screen and the third execution screen may include information related to the event.

According to various example embodiments, the displaying of the second execution screen on the second display area may include determining, in response to the physical movement sensed through the sensing circuit based on occurrence of the event, a direction for displaying the second execution screen on the second display area while the first application is being executed.

According to various example embodiments, the displaying of the second execution screen on the second display area may include terminating the execution of the second application in response to at least one of the folding operation and the physical movement sensed through the sensing circuit after displaying the second execution screen on the second display area.

According to various example embodiments, an electronic device may include: a foldable housing including a hinge structure comprising a hinge, a first housing coupled to the hinge structure and including a first surface facing a first direction and a second surface facing a second direction opposite the first direction, and a second housing coupled to the hinge structure, including a third surface facing a third direction and a fourth surface facing a fourth direction opposite the third direction, and configured to be folded with respect to the first housing about the hinge structure and configured such that the first surface faces the third surface in a folded state and such that the third direction is the same as the first direction in an unfolded state, a first display extending from the first surface to the third surface to form the first surface and the third surface, a sensing circuit disposed inside the first housing or the second housing and configured to sense rotation, the folded state, or the unfolded state of the foldable housing, a second display visible through at least a portion of the second surface or fourth surface, a processor disposed inside the first housing or the second housing and operatively connected to the sensing circuit, and a memory operatively connected to the processor, wherein the memory may store instructions that, when executed, cause the processor to: control the display to display content related to a first application on the first display in the unfolded state, sense that an event related to a second application occurs while displaying the content, based on the event occurring, display a notification related to the event on at least a portion of the first display, and based on the rotation or the folded state of the foldable housing being sensed using the sensing circuit while displaying the notification, display content related to the second application on the second display.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a first housing comprising a first surface and a second surface facing an opposite direction of the first surface;
   a second housing comprising a third surface disposed to face the first surface based on a rotational direction and a fourth surface facing an opposite direction of the third surface;
   a hinge structure comprising a hinge configured to rotatably connect the first housing and the second housing;
   at least one display comprising a first display area disposed on at least one of the first surface and the third surface, and a second display area disposed on at least one of the second surface and the fourth surface;
   a sensing circuit configured to sense at least one of a folding operation between the first housing and the second housing and a physical movement of the electronic device; and
   a processor electrically connected to the display and the sensing circuit,
   wherein the processor is configured to:
   control the display to display a first execution screen according to execution of a first application on the first display area;
   monitor whether an event related to a second application occurs while the first execution screen is displayed on the first display area;
   based on the physical movement sensed through the sensing circuit based on occurrence of the event corresponding to a first rotational direction, control the display to display a second execution screen according to the execution of the second application related to the event on the second display area while the first application is being executed; and based on the physical movement sensed through the sensing circuit based on occurrence of the event corresponding to a second rotational direction different from the first rotational direction, control the display to display a third execution screen according to execution of a third application related to the event on the second display area while the first application is being executed, the third application being different from the second application, and the second execution screen and the third execution screen comprising information related to the event.

2. The electronic device of claim 1, wherein the display comprises:
a first display comprising the first display area and controlled by a first display driver IC (DDI); and
a second display comprising the second display area and controlled by a second DDI.

3. The electronic device of claim 1, wherein the at least one display comprises a touch sensor configured to detect a touch input, and
the processor is configured to, based on the second execution screen being displayed on the second display area while the first application is being executed in response to at least one of the folding operation and the physical movement sensed through the sensing circuit based on occurrence of the event, deactivate a touch sensor corresponding to the first display area.

4. The electronic device of claim 1, wherein the processor is configured to, based on the first application being a program related to playback of a video, control the display to display the second execution screen on the second display area while pausing playback of a video by the first application in response to at least one of the folding operation and the physical movement sensed through the sensing circuit based on the event occurring.

5. The electronic device of claim 1, wherein the processor is configured to, in response to an input for receiving the event based on occurrence of the event, control the display to display at least a portion of the second execution screen on the first display area while the first application is being executed.

6. The electronic device of claim 1, wherein the physical movement sensed through the sensing circuit based on occurrence of the event corresponding to the first rotational direction or the second rotation direction is sensed while the first housing and the second housing are in an unfolded state.

7. The electronic device of claim 1, wherein the event is a message notification, the second application is a message service program, and the third application is a phone program.

8. The electronic device of claim 1, wherein the processor is configured to determine, in response to the physical movement sensed through the sensing circuit based on occurrence of the event, a direction for displaying the second execution screen on the second display area while the first application is being executed.

9. The electronic device of claim 1, wherein the processor is configured to control the display to display, in response to at least one of the folding operation and the physical movement sensed through the sensing circuit based on occurrence of the event, a second execution screen related to the event on the first display area while the first application is being executed.

10. A method of controlling a display of an electronic device comprising a first housing, a second housing, a hinge structure comprising a hinge configured to rotatably connect the first housing and the second housing, and a sensing circuit configured to sense at least one of a folding operation between the first housing and the second housing and a physical movement of the electronic device, the method comprising:

displaying a first execution screen according to execution of a first application on a first display area of the display;

monitoring whether an event related to a second application occurs while the first execution screen is being displayed on the first display area; and based on a physical movement sensed through the sensing circuit based on occurrence of the event corresponding to a first rotational direction of the electronic device, displaying a second execution screen according to the execution of the second application related to the event on a second display area of the display while the first application is being executed; and based on the physical movement sensed through the sensing circuit based on occurrence of the event corresponding to a second rotational direction different from the first rotational direction, displaying a third execution screen according to execution of a third application related to the event on the second display area while the first application is being executed, the third application being different from the second application, and the second execution screen and the third execution screen comprising information related to the event.

11. The method of claim 10, wherein the displaying of the second execution screen on the second display area comprises deactivating a touch sensor corresponding to the first display area.

12. The method of claim 10, wherein the displaying of the second execution screen on the second display area comprises, based on the first application being a program related to playback of a video, displaying the second execution screen on the second display area while pausing playback of a video by the first application in response to at least one of the folding operation and the physical movement sensed through the sensing circuit based on the event occurring.

13. The method of claim 10, wherein the physical movement sensed through the sensing circuit based on occurrence of the event corresponding to the first rotational direction or the second rotation direction is sensed while the first housing and the second housing are in an unfolded state.

14. The method of claim 10, wherein the event is a message notification, the second application is a message service program, and the third application is a phone program.

15. The method of claim 10, wherein the displaying of the second execution screen on the second display area comprises, in response to the physical movement sensed through the sensing circuit based on occurrence of the event, determining a direction for displaying the second execution screen on the second display area while the first application is being executed.

16. The method of claim 10, wherein the first application is a game application, the event is a message notification, the second application is a message service program, and the third application is a phone program, the physical movement sensed through the sensing circuit based on occurrence of the event corresponding to the first rotational direction or the second rotation direction is sensed while the first housing and the second housing are in an unfolded state, the first rotational direction is in an x-axis direction of the electronic device and the second rotation direction is in a y-axis direction.

17. A non-transitory computer readable storage medium storing instructions that, when executed, cause a processor to control a display of an electronic device comprising a first housing, a second housing, a hinge structure comprising a hinge configured to rotatably connect the first housing and the second housing, and a sensing circuit configured to sense at least one of a folding operation between the first housing and the second housing and a physical movement of the electronic device, wherein the instructions cause the processor to:
  display a first execution screen according to execution of a first application on a first display area of the display;
  monitor whether an event related to a second application occurs while the first execution screen is being displayed on the first display area; and
  based on a physical movement sensed through the sensing circuit based on occurrence of the event corresponding to a first rotational direction of the electronic device, display a second execution screen according to the execution of the second application related to the event on a second display area of the display while the first application is being executed; and
  based on the physical movement sensed through the sensing circuit based on occurrence of the event corresponding to a second rotational direction different from the first rotational direction, display a third execution screen according to execution of a third application related to the event on the second display area while the first application is being executed,
  the third application being different from the second application, and
  the second execution screen and the third execution screen comprising information related to the event.

* * * * *